United States Patent

Iguchi et al.

[11] Patent Number: 5,901,254
[45] Date of Patent: May 4, 1999

[54] APPARATUS AND METHOD FOR IMAGE REDUCTION

[75] Inventors: Hiroaki Iguchi, Yokohama; Yasuo Kurosu, Yokosuka; Yoshihiro Yokoyama, Yokohama; Hiroshi Abei, Yokohama; Masaaki Fujinawa, Kanagawa-ken, all of Japan

[73] Assignee: Hitachi, Ltd., Tokyo, Japan

[21] Appl. No.: 08/910,073

[22] Filed: Aug. 12, 1997

Related U.S. Application Data

[63] Continuation of application No. 08/309,421, Sep. 20, 1994, abandoned.

[30] Foreign Application Priority Data

Sep. 20, 1993 [JP] Japan .................................. 5-233837

[51] Int. Cl.⁶ ...................................... G06K 9/42
[52] U.S. Cl. .............................................. 382/298
[58] Field of Search .................................. 382/299, 298, 382/288, 258, 162

[56] References Cited

U.S. PATENT DOCUMENTS

| | | | |
|---|---|---|---|
| 4,499,597 | 2/1985 | Alves | 382/288 |
| 4,872,064 | 10/1989 | Tutt | 382/298 |
| 4,881,069 | 11/1989 | Kameda et al. | 382/299 |
| 5,054,099 | 10/1991 | Wakabayashi | 382/298 |
| 5,101,443 | 3/1992 | Behrmann-Poitiers | 382/298 |
| 5,138,672 | 8/1992 | Hirabayashi et al. | |
| 5,161,213 | 11/1992 | Knowlton | 382/299 |
| 5,261,012 | 11/1993 | Hardy et al. | 382/258 |
| 5,539,534 | 7/1996 | Hino et al. | 382/298 |

FOREIGN PATENT DOCUMENTS

| | | |
|---|---|---|
| 1-238275 | 9/1987 | Japan . |
| 2-290369 | 11/1990 | Japan . |

OTHER PUBLICATIONS

Levine, Vision in Man and Machine, McGraw–Hill Book Co., 1985, pp. 526–528.

*Primary Examiner*—Yon J. Couso
*Attorney, Agent, or Firm*—Antonelli, Terry, Stout & Kraus, LLP

[57] ABSTRACT

The present invention provides an image reducing system and method capable of retaining fine lines in a reduced image by reducing an original image and by quickly forming the reduced image with high quality. The method includes specifying positions of pixels of a reduced image in the original image according to reduction ratios, extracting a run of pieces of the same color information about the color of the pixels of the original image as a line, determining the line width of the extracted line and determining the line width after reduction in the reduction ratios based on the line width of the extracted line and calculating the centroid of the extracted line, and retaining the color information about the extracted line at a reduced pixel near the centroid on the basis of the centroid of the extracted line and the line width after reduction. The method further performs the step of determining the color information about each reduced pixel based on the retained color information.

39 Claims, 24 Drawing Sheets

$(n_x=1/2, n_y=1/2)$

| $S_{00}$ | $S_{10}$ | $S_{01}$ | $S_{11}$ | $R_{00}$ | $R_{10}$ | $R_{01}$ | $R_{11}$ |
|---|---|---|---|---|---|---|---|
| 0 | 0 | 0 | 0 | 0 | 0 | 0 | 0 |
| 0 | 0 | 0 | 1 | 0 | 0 | 0 | 1 |
| 0 | 0 | 1 | 0 | 0 | 0 | 1 | 0 |
| 0 | 0 | 1 | 1 | 0 | 0 | 1 | 0 |
| 0 | 1 | 0 | 0 | 0 | 1 | 0 | 0 |
| 0 | 1 | 0 | 1 | 0 | 1 | 0 | 0 |
| 0 | 1 | 1 | 0 | 0 | 0 | 1 | 0 |
| 0 | 1 | 1 | 1 | 0 | 0 | 1 | 1 |
| 1 | 0 | 0 | 0 | 1 | 0 | 0 | 0 |
| 1 | 0 | 0 | 1 | 1 | 0 | 0 | 0 |
| 1 | 0 | 1 | 0 | 1 | 0 | 0 | 0 |
| 1 | 0 | 1 | 1 | 1 | 0 | 1 | 0 |
| 1 | 1 | 0 | 0 | 1 | 0 | 0 | 0 |
| 1 | 1 | 0 | 1 | 1 | 1 | 0 | 0 |
| 1 | 1 | 1 | 0 | 1 | 0 | 1 | 0 |
| 1 | 1 | 1 | 1 | 1 | 0 | 0 | 0 |

$\circ S_{00}$  $\circ S_{01}$ $\circ S_{10}$  $\circ S_{11}$ $\circ S_{20}$  $\circ S_{21}$ $R_{10}$ ×   $R_{11}$ ×

FIG. 15A
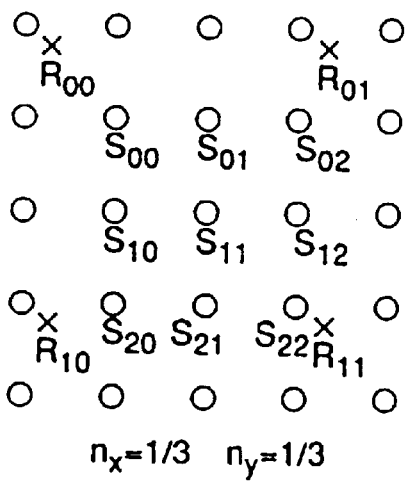
$n_x=1/3$  $n_y=1/3$
FIG. 15B
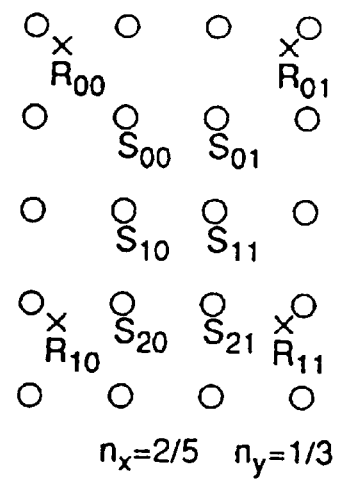
$n_x=2/5$  $n_y=1/3$
FIG. 16A
× $R_{00}$
$S_{00}$ ●
$S_{10}$ ● ←G
$S_{20}$ ●
× $R_{10}$
$S_{30}$ ○
$S_{40}$ ○
$S_{50}$ ○
× $R_{20}$
$n_y=1/3$
FIG. 16B
× $R_{00}$
$S_{00}$ ○
$S_{10}$ ●
$S_{20}$ ● ←G
× $R_{10}$
$S_{30}$ ●
$S_{40}$ ○
$S_{50}$ ○
× $R_{20}$
$n_y=1/3$
FIG. 16C
× $R_{00}$
$S_{00}$ ○
$S_{10}$ ○
$S_{20}$ ○
× $R_{10}$
$S_{30}$ ●
$S_{40}$ ● ←G
$S_{50}$ ●
× $R_{20}$
$n_y=1/3$

FIG. 17A   FIG. 17B   FIG. 17C

| | | |
|---|---|---|
| × $R_{00}$ | × $R_{00}$ | × $R_{00}$ |
| $S_{00}$ ● | $S_{00}$ ○ | $S_{00}$ ○ |
| $S_{10}$ ● | $S_{10}$ ● | $S_{10}$ ○ |
| · ←G | | |
| $S_{20}$ ● | $S_{20}$ ● | $S_{20}$ ○ |
| × $R_{10}$ | × $R_{10}$ · ←G | × $R_{10}$ |
| $S_{30}$ ● | $S_{30}$ ● | $S_{30}$ ● |
| $S_{40}$ ○ | $S_{40}$ ● | $S_{40}$ ● |
| | | · ←G |
| $S_{50}$ ○ | $S_{50}$ ○ | $S_{50}$ ● |
| × $R_{20}$ | × $R_{20}$ | × $R_{20}$ |
| $S_{60}$ ○ | $S_{60}$ ○ | $S_{60}$ ● |

APPARATUS AND METHOD FOR IMAGE REDUCTION

This application is a continuation of application Ser. No. 08/309,421, filed on Sep. 20, 1994, now abandoned.

BACKGROUND OF THE INVENTION

The present invention relates to an image reducing system for reducing an image expressed by binary values respectively representing a white point and a black point. More particularly, the present invention relates to an image reducing system and method for converting a character image into a corresponding reduced character image without entailing significant deterioration of image quality.

Methods for reducing an image have been proposed such as the selective processing conversion method (SPC method), the logical OR method, the nine-division method and the fast projection method. Every one of those known methods determines the density of converted pixels on the basis of four adjacent original pixels. Henceforth, the term "converted pixel" means a pixel on a reduced image, and the term, nonconverted pixel means a pixel on an original image. The SPC method selects one original pixel nearest to a converted pixel and uses color information about the original pixel as the value of the converted pixel. The logical OR method determines the density (color information) of a converted pixel on the basis of the logical OR between the densities of four original pixels nearest to the converted pixel. The nine-division method divides a square block defined by four original pixels into nine partial blocks and determines the density of the converted pixel by using logical expressions predetermined for the nine partial blocks including convert ed pixels. The SPC, logical OR and nine-division methods are described in "Evaluation of Same Binary Image Enlargement and Shrink Methods and Stepped-Up Method" by H. Shojima, et al., Information Processing Society of Japan, September 1985, pp. 920–925. The fast projection method is describe in Japanese Patent Laid-open (Kokai) No. 58-97958 and "Fast Pixels Density Conversion Method Based on Projection Method", Institute of Image Electronics Engineers of Japan, Vol. 11, No. 2, pp.72–83 (1982).

Since the above-described known image reducing methods determine the density of the converted pixel on the basis of the four nonconverted pixels around the converted pixel, no reference is made to some of the nonconverted pixels in reducing the original image when the horizontal reduction ratio nx and the vertical reduction ratio ny are smaller than ½. For example, when the original image is reduced by the SPC method that selects the value of an original pixel nearest to a converted pixel, a fine line having a line width corresponding to m pixels disappears if any converted pixel is not included in the fine line. The rest of the image reducing methods also have the problem that a fine line disappears when the fine line is formed of pixels to which no reference is made.

An image reducing method capable of retaining fine lines, described in Japanese Patent Laid-open (Kokai) Nos. 1-238275 and 2-290369, and "Extended Thin Line Preservation Methods for Binary Image Reduction" by K. Wakabayashi, et al. Denshi Tsushin Gakkai Ronbun-shi, D-II, Vol. J75-D-II, No. 8, pp. 1364–1371 makes reference to a reference pixel block defined by the product $4(1/n_x) \times (1/n_y)$ of $2 \times (1/n_x)$ horizontal rows of nonconverted pixels and $2(1/n_y)$ vertical rows of nonconverted pixels, where $n_x$ is a horizontal reduction ratio and $n_y$ is a vertical reduction ratio when the horizontal reduction ratio $n_x$ and the vertical reduction ratio $n_y$ are smaller than ½ when calculating the density of the converted pixel. Henceforth, the term "original image reference pixel" means original pixel to which reference is made to retain a black line, and the term "reference pixel block" means a block including pixels to which reference is made in each reference cycle. Those methods match a fine line included in the reference pixel block to a predetermined pattern, determine that horizontal lines, vertical lines and oblique lines having a length greater than a predetermined length are fine lines, retains the fine lines and determines converted pixels.

When an original image is reduced by this known method, there is no converted pixel to which reference is not made in reducing an image even if the horizontal reduction ratio $n_x$ and the vertical reduction ratio $n_y$ are smaller than ½ and any fine line will not disappear. However, this known method has a problem that the line width of a line in a reduced image varies depending on the relation between the position of a white or black line in the original image and the position of the pixels of the reduced image.

This problem in the known method will be described with reference to FIGS. 20A and 20B. In FIGS. 20A and 20B, pixels indicated at $S_{pq}$ are reference pixels in an original image, and those indicated at $R_{rs}$ are reduced pixels. The horizontal reduction ratio $n_x = \frac{1}{3}$ and the vertical reduction ratio $n_y = \frac{1}{3}$. In FIG. 20A, pixels $S_{01}$ to $S_{04}$, $S_{11}$ to $S_{14}$, ... and $S_{71}$ to $S_{74}$ represented by solid circles form a vertical black line having a line width $d_x$=4-pixel width, i.e., a width corresponding to four pixels. Similarly, in FIG. 20B, pixels $S_{02}$ to $S_{05}$, $S_{12}$ to $S_{15}$, ... and $S_{71}$ to $S_{75}$ represented by solid circles form a longitudinal line having a line width $d_x$=4-pixel width, i.e., a width corresponding to four pixels.

The aforesaid known method defines fine black lines with a horizontal line width $d_x < 1/n_x$ or a vertical line width $d_y < 1/n_y$. Therefore, in the example shown in FIGS. 20A and 20B, the black line cannot be detected because the line width $d_x$=4-pixel width and $1/n_x$=3. In such a case, the known method, such as the SPC method or a fast projection method, calculates the values of nonconverted pixels in the neighborhood of the converted pixel.

Accordingly, when the black line in the original image lies at the position shown in FIG. 20A, the SPC method or the fast projection method maps the black line shown in FIG. 20A to reduced pixels $R_{01}$ to $R_{21}$ represented by solid squares and forming a black line having a line width corresponding to one pixel. For example, the SPC method selects the nearest original image pixel for mapping. Therefore, the pixel $S_{02}$ is selected and mapped to the reduced pixel $R_{01}$ and the reduced pixel $R_{01}$ is a black pixel. Similarly, the pixel $S_{32}$ is selected and mapped to the reduced pixel $R_{11}$ and the pixel $R_{11}$ is a black pixel, the pixel $S_{35}$ is selected and mapped to the reduced pixel $R_{12}$ and the reduced pixel $R_{12}$ is a white pixel. The fast projection method determines the color of the reduced pixel on the basis of the colors of four pixels in the neighborhood of the reduced pixel, and the positional relation between those four pixels and the reduced pixel.

For example, since all four pixels $S_{02}$, $S_{12}$, $S_{03}$ and $S_{13}$ surrounding the reduced pixel $R_{01}$ are black pixels, the reduced pixel $R_{01}$ is a black pixel. Similarly, since all four pixels $S_{32}$, $S_{42}$, $S_{33}$ and $S_{43}$ surrounding the reduced pixel $R_{11}$ are black pixels, the reduced pixel $R_{11}$ is a black pixel, since all four pixels $S_{05}$, $S_{15}$, $S_{06}$ and $S_{16}$ surrounding the reduced pixel $R_{02}$ are white pixels, the reduced pixel $R_{02}$ is a white pixel, and since all four pixels $S_{35}$, $S_{45}$, $S_{36}$ and $S_{46}$ surrounding the reduced pixel $R_{12}$ are white pixels, the reduced pixel $R_{12}$ is a white pixel.

However, when the black line in the original image lies at the position shown in FIG. 20B, the SPC method or the fast projection method maps the black line of FIG. 20B to reduced pixels $R_{01}$ to $R_{21}$ and $R_{02}$ to $R_{22}$ represented by solid squares, so that a black line having a 2-pixel width is formed. For example, the SPC method selects the nearest original image pixel for mapping. Therefore, the original pixel $S_{02}$ is selected and mapped to the reduced pixel $R_{01}$ and hence the reduced pixel $R_{01}$ is a black pixel; the original pixel $S_{32}$ is mapped to the reduced pixel $R_{11}$ and hence the reduced pixel $R_{11}$ is a black pixel; the original pixel $S_{05}$ is mapped to the reduced pixel $R_{02}$ and hence the reduced pixel $R_{02}$ is a black pixel; and the original pixel $S_{35}$ is mapped to the reduced pixel $R_{12}$ and hence the reduced pixel $R_{12}$ is a black pixel. When the fast projection method is used, the reduced pixel $R_{01}$ is a black pixel because all the four original pixels $S_{02}$, $S_{12}$, $S_{03}$ and $S_{13}$ surrounding the reduced pixel $R_{01}$ are black pixels; the reduced pixel $R_{11}$ is a black pixel because all the four original pixels $S_{32}$, $S_{42}$, $S_{33}$ and $S_{43}$ surrounding the reduced pixel $R_{11}$ are black pixels; the reduced pixel $R_{02}$ is a black pixel because two original pixels $S_{05}$ and $S_{15}$ nearest the reduced pixel $R_{02}$ are black pixels; and the reduced pixel $R_{12}$ is a black pixel because two pixels $S_{35}$ and $S_{45}$ nearest the reduced pixel $R_{12}$ are black pixels.

Thus, in the examples shown in FIGS. 20A and 20B, when the original image is reduced in a reduction ratio of ⅓, the black line having a 4-pixel width in the original image is mapped to either a black line having a 1-pixel width or a black line having 2-pixel width, depending on the position of the line in the original image and the positions of the reduced pixels. Generally, when the original image is reduced by the foregoing known methods, the width of the black lines and the white lines in the reduced image formed by reducing the black line and the white line of the original image is not dependent uniquely on the position of the line in the original image and the positions of the reduced pixels, causing the distortion of the reduced image, i.e., the deterioration of the image quality.

Furthermore, reference must be made to $4(1/n_x) \times (1/n_y)$ pixels in the reference pixel block in the original image to reduce the original image in a horizontal reduction ratio $n_x$ and a vertical reduction ratio $n_y$ ($n_x$ and $n_y$ are smaller than ½) and, consequently, reference must be made four times or above to the original image.

SUMMARY OF THE INVENTION

A first object of the present invention is to provide an image reducing system capable of quickly reducing and converting an original image by curtailing original image reference blocks and making reference to the original image by a reduced number of times.

A second object of the present invention is to provide an image reducing system capable of uniquely determining the line width of lines in a reduced image on the basis of the line width of lines in the original image and of forming the reduced image without conspicuous distortion in a high image quality.

To achieve the first object, the present invention provides an image reducing system having an image input unit for entering an original image, an image reducing unit that reduces the original image entered by the image input unit in reduction ratios, and an output unit that provides a reduced image formed by the image reducing unit. The image reducing unit includes a reduced pixel position specifying apparatus for specifying positions for pixels in the original image after reducing the original image in the reduction ratios, a reference pixel block determining apparatus for determining a reference pixel block corresponding to a pixel block in the original image, defined by points corresponding to four reduced pixels specified by the reduced pixel position specifying apparatus, a line extracting apparatus for extracting a run of pieces of the same color information representing the colors of the pixels of the original image from the reference pixel block determined by the reference pixel block determining apparatus as a line, a retention position determining apparatus for calculating the centroid of the line extracted by the line extracting apparatus and retaining the color information about the line at the reduced pixel near the centroid of the line, and a pixel color determining apparatus for determining color information about each reduced pixel based on the color information retained by the retention position determining apparatus. As one skilled in the art can appreciate, the color of pixels to be reduced in accordance with the present invention may be red, green, blue or another color in addition to black and white.

The reduced pixel position specifying apparatus may determine reduced pixel positions at horizontal intervals of $1/n_x$ and at vertical intervals of $1/n_y$, where $n_x$ is a horizontal reduction ratio smaller than 1 (one), $n_y$ is a vertical reduction ratio smaller than 1 (one), and the intervals of the pixels of the original image is 1 (one). The line extracting apparatus may use a predetermined piece of color information to extract the line. The pixel color determining apparatus may determine color information about one reduced pixel on the basis of the logical OR between pieces of color information about the reduced pixels, retained by the retention position determining apparatus.

The image reducing unit may hold beforehand a pattern of color information about the reduced pixels corresponding to the pixels of the original image, determined by the component apparatus in a reference pixel block corresponding to the reduction ratios, and may achieve reduction by matching the pattern and the pixels of the original image in the reference pixel block corresponding to the reduction ratios.

The retention position determining apparatus may further calculate the centroids of all the lines in the reference pixel block, and retain information about the reduced pixels corresponding to the lines at reduced pixels near the centroids for the reference pixel block. The retention position determining apparatus may predetermine a preferential retention position beforehand when the calculated centroid is at the center of a block defined by a plurality of reduced pixels when retaining the information about the reduced pixels.

To achieve the second object, the present invention provides an image reducing system having an image input unit for entering an original image, an image reducing unit for reducing the original image entered by the image input unit in reduction ratios, and an output unit for providing a reduced image reduced by the image reducing unit. The image reducing unit includes a reduced pixel position specifying apparatus for specifying the position of a reduced pixel reduced according to the reduction ratios in the original image, a line extracting apparatus for extracting a run of pieces of the predetermined same color information representing the colors of pixels from the original image as a line, line width determining apparatus for determining the width of the line extracted by the line extracting apparatus and determining the width of the reduced line from the width of the line on the basis of the reduction ratios, a retention position determining apparatus for calculating the centroid of each of the lines extracted by the line extracting apparatus, and retaining color information about the line in a reduced pixel near the line on the basis of the centroid of the line and the width of the reduced line determined by the line width determining apparatus, and a pixel color determining apparatus for determining color information about each reduced pixel on the basis of color information retained by the retention position determining apparatus.

The line width determining apparatus may specify the width of a reduced line for the previously determined width of the line of the original image and the reduction ratios to determine the width of the reduced line. The line width determining apparatus may determine the width m (natural number) of the reduced line by using h=[d×n+k], where [ ] indicates the rounding up of the decimal part of a value (for example, [a] is an integral number i meeting i≧a>i−1), d (natural number) is the line width of the original image, n (real number smaller than 1 (one)) is horizontal or vertical reduction ratio, k is a predetermined optional real number, and m=1 when h<1 or m=h when h≧1 or may determine the width m (natural number) of the reduced line by using j=<d×n+k>, where <> indicates the rounding down of the decimal part of a value (for example, <a> is an integral number p meeting p+1>a≧p), d (natural number) is the line width of the original image, n (real number smaller than 1 (one)) is horizontal or vertical reduction ratio, k is a predetermined optional real number, and m=1 when j<1 or m=j when j≧1.

The image reducing system may further include a reference pixel block determining apparatus for determining the pixel block of the original image previously specified by the reduced pixel position specifying apparatus as a reference pixel block, wherein the line extracting apparatus extracts a line from the reference pixel block determined by the reference pixel block determining apparatus. The image reducing system may also include a reference pixel block determining apparatus for determining a pixel block in the original image defined by points corresponding to four reduced pixels specified by the reduced pixel position specifying apparatus as a reference pixel block, wherein the line extracting apparatus extracts a line from the reference pixel block determined by the reference pixel block determining apparatus, the line width determining apparatus and the retention position determining apparatus operate in either a first mode in which the line width determining apparatus and the retention position determining apparatus operate in the reference pixel block determined by the reference pixel block determining apparatus or a second mode in which the line width determining apparatus and the retention position determining apparatus operate, when the line extracted by the line extracting apparatus extend in both a first reference pixel block and an adjacent second reference pixel block, in the reference pixel block including the pixels of the original image, and the pixel color determining apparatus determines color information about the reduced pixel on the basis of information about the reduced pixel retained in the first mode and the second mode. The line width determining apparatus in the second mode may indicate, when the line extracted by the line extracting apparatus extends in both the first reference pixel block and the second reference pixel block, the line width of the original image in the first reference pixel block determined by the line width determining apparatus and a fact that the line extends in both the first reference pixel block and the adjacent second reference pixel block, may determine, when operating in the second reference pixel block, the line width after reduction on the basis of the line width of the original image in the first reference pixel block, the line width of the original image in the second reference pixel block in which the line extends, and the reduction ratios, and the retention position determining apparatus in the second mode may calculate the centroid of the line extending in both the first reference pixel block and the second reference pixel block.

The reduced pixel position specifying apparatus may set the positions of pixels of a reduced image at horizontal intervals of $1/n_x$ and vertical intervals of $1/n_y$, where $n_x$ is a horizontal reduction ratio smaller than 1 (one), $n_y$ is a vertical reduction ratio smaller than 1 (one), and the distance between the pixels of the original image is 1 (one). The pixel color determining apparatus may determine color information about one reduced pixel on the basis of the logical OR between pieces of color information retained by the retention position determining apparatus for the reduced pixel.

The image reducing unit may hold beforehand the color information about reduced pixels corresponding to the pixels of the original image obtained by the component apparatus, and available in the reference pixel block corresponding to the reduction ratios, in a pattern, and may match the pattern and the pixels of the original image within the reference pixel block corresponding to the reduction ratios. The retention position determining apparatus may calculate the centroids of all the lines in the reference pixel blocks, and may retain pieces of color information about the lines at reduced pixels near the centroids. The retention position determining apparatus may specify a preferential retention position beforehand when the position of the calculated centroid coincides with the center of a block defined by a plurality of reduced pixels when retaining the information about the reduced pixels.

The retention position determining apparatus may retain the color information when the number of pixels having color information and forming the line is equal to a predetermined number. The line extracting apparatus may extract the line when there is at least one pixel having predetermined color information.

To achieve the first object, the present invention provides a method of reducing an original image in reduction ratios, having the steps of specifying positions of pixels of a reduced image in the original image according to the reduction ratios, determining a pixel block defined by the four specified positions of reduced pixels as a reference pixel block in the original image, extracting a run of pieces of the same color information abut the color of the pixels of the original image as a line, calculating the centroid of each extracted line and retaining the color information about the line at a reduced pixel near the centroid of the line, and determining the color information about each reduced pixel on the basis of the retained color information.

To achieve the second object, the present invention provides a method of reducing an original image in reduction ratios, having the steps of specifying positions of pixels of a reduced image in the original image according to the reduction ratios, extracting a run of pieces of the color information about the color of the pixels of the original image as a line, determining the line width of the extracted line and determining the line width after reduction according to the reduction ratios based on the line width of the extracted line, calculating the centroid of each extracted line, and retaining the color information about the extracted line at a reduced pixel near the centroid on the basis of the centroid of the extracted line and the line width after reduction, and determining the color information about each reduced pixel on the basis of the retained color information.

To achieve the first object of the present invention, the image input unit enters an original image, and then the image reducing unit reduces the original image entered by the image input unit in reduction ratios. The reduced pixel position specifying apparatus of the image reducing unit specifies positions for pixels in the original image after reduction in the reduction ratios. The reference pixel block determining apparatus determines a reference pixel block corresponding to a pixel block in the original image, defined by points corresponding to four reduced pixels specified by the reduced pixel position specifying apparatus. The line extracting apparatus extracts a run of pieces of the same color information representing the colors of the pixels of the original image from the reference pixel block determined by the reference pixel block determining apparatus as a line. The retention position determining apparatus calculates the centroid of the line extracted by the line extracting apparatus and retains the color information about the line at the reduced pixel near the centroid of the line. The pixel color determining apparatus determines color information about each reduced pixel based on the color information retained by the retention position determining apparatus. The output unit provides the reduced image reduced by the image reducing apparatus. Since the color information about the reduced pixel for each reference pixel block is retained, the number of times of making reference to one reference pixel block is reduced, so that the speed of the image reducing operation can be enhanced.

To achieve the second object of the present invention, information about line width is detected to determine color information about the reduced pixel.

A method of reducing an original image, capable of retaining fine lines will be described hereinafter. When an original image is entered by the image input unit, the image reducing unit reduces the original image entered by the image input unit in reduction ratios. The reduced pixel position specifying apparatus of the image reducing unit specifies positions for pixels in the original image after reduction in the reduction ratios. The line extracting apparatus extracts a run of pieces of the same color information representing the colors of the pixels of the original image as a line. The line width determining apparatus determines the line width of the line extracted by the line extracting apparatus and determines the line width after reduction based on the determined line width and the reduction ratios. The retention position determining apparatus calculates the centroid of each extracted line extracted by the line extracting apparatus, and retains the color information about the extracted line at the reduced pixel in the neighborhood based on the centroid of the line and the line width after reduction determined by the line width determining apparatus. The pixel color determining apparatus determines color information about each reduced pixel on the basis of color information retained by the retention position determining apparatus. The output unit provides a reduced image reduced by the image reducing unit.

Thus, the image reducing system in accordance with the present invention is capable of preventing change in the line width of the reduced image depending on the position of the fine in the original image. Therefore, change in the line width in the reduced image depending on the position of the line in the original image and the position of the reduced pixels, that occur when the original image is reduced by the conventional fine line retaining system, can be obviated.

BRIEF DESCRIPTION OF THE DRAWINGS

The present invention will be more apparent from the following detailed description, when taken in conjunction with the accompanying drawings, in which:

FIGS. 6A and 6B are a diagram and a table, respectively, for explaining another method of determining a pixel at which a black line is to be retained, by table matching to be carried out by the image reducing system in the first embodiment;

FIG. 7 is a diagram for explaining a method of calculating reduced pixel density in the first embodiment;

FIGS. 10A and 10B are diagrams for explaining original image reference pixel blocks to be employed by the image reducing system in the second embodiment;

FIGS. 15A and 15B are diagrams for explaining original image reference pixel blocks to be employed by the image reducing system in the third embodiment;

FIGS. 16A, 16B and 16C are diagrams for explaining a method of determining the centroid of a black line and a pixel at which the black line is to be retained to be carried out by the image reducing system in the third embodiment;

FIGS. 17A, 17B and 17C are diagrams for explaining another method of determining the centroid of a black line and a pixel at which the black line is to be retained to be carried out by the image reducing system in the third embodiment;

Figures 20A, 20B:
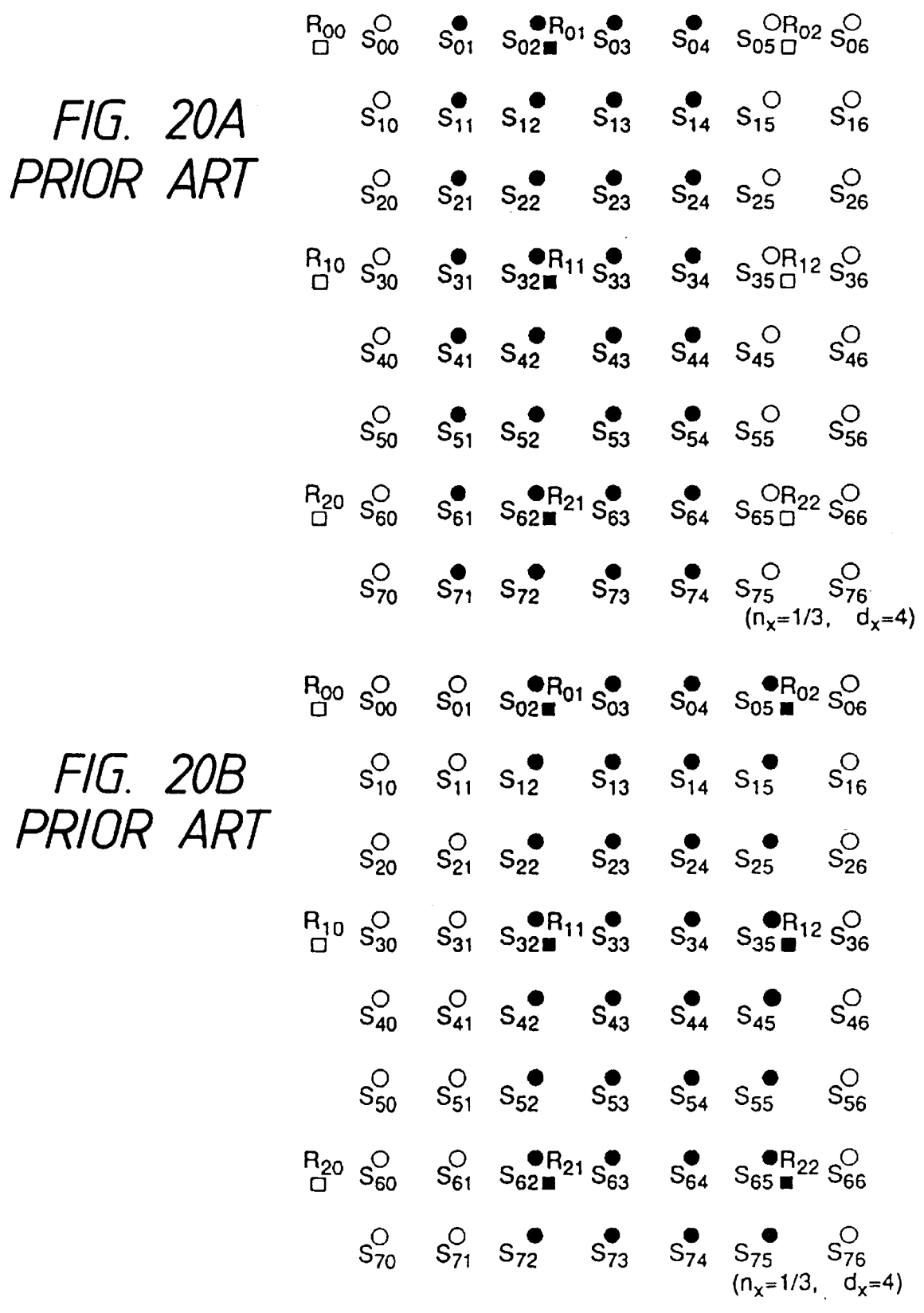

FIGS. 20A and 20B are diagrams for explaining problems in a conventional image reducing method;

DETAILED DESCRIPTION OF THE PREFERRED EMBODIMENTS

Preferred embodiments of the present invention will be described hereinafter with reference to the accompanying drawings.

Figure 1:
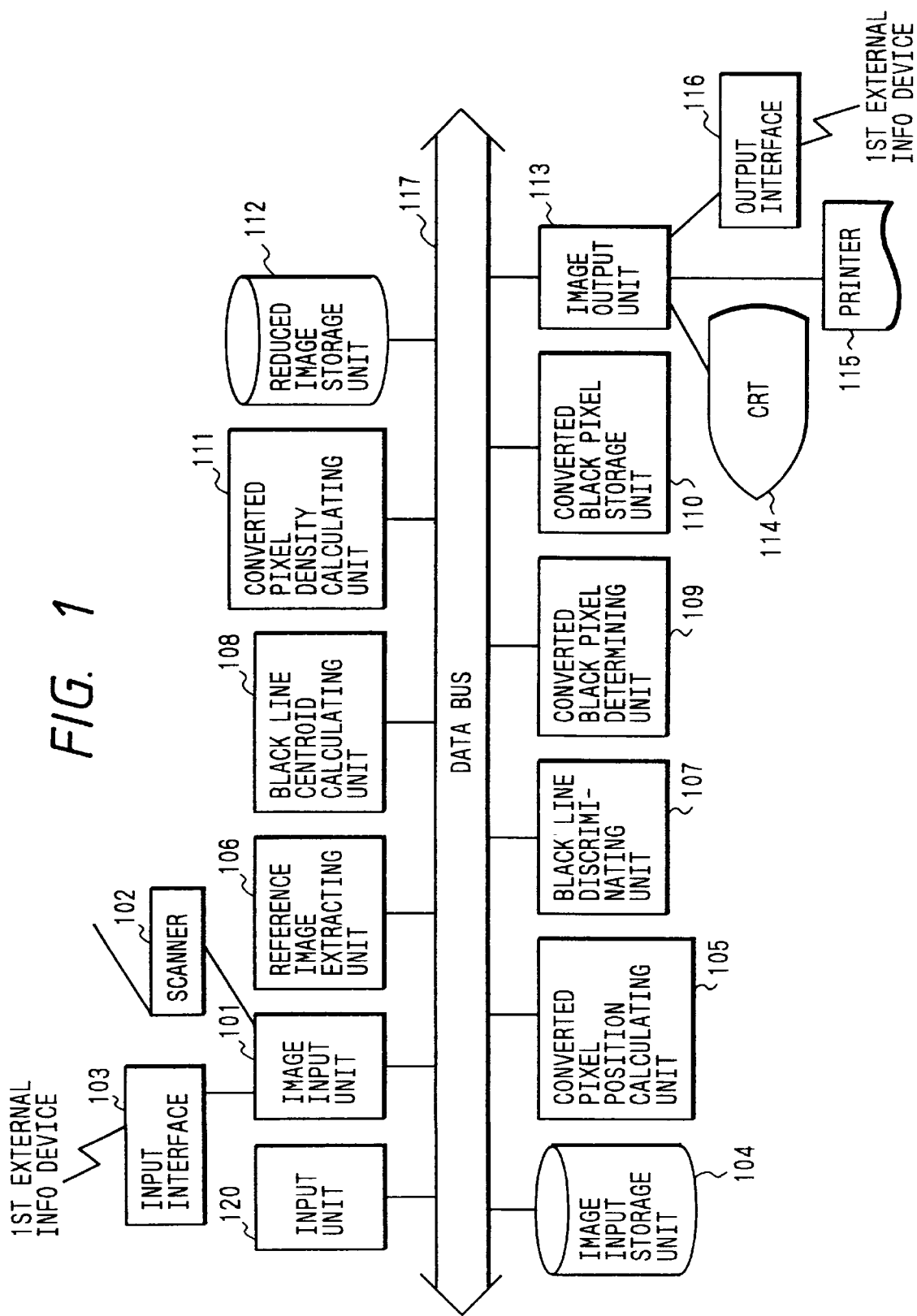
FIG. 1 is a block diagram of an image reducing system in an embodiment according to the present invention.

FIG. 1 shows an image reducing system in a first embodiment according to the present invention.

Referring to FIG. 1, an image input unit 101 receives image data through a network or an interface; a scanner 102 scans a picture formed on a recording sheet or the like to read image data; an input interface 103 reads image data from an external information device; an input unit 120 receives instructions including reduction ratios; an input image storage unit 104 stores the input image; a converted pixel position calculating unit 105 calculates the positions of pixels to be converted in the pixel array of the original image; a reference image extracting unit 106 extracts original image reference pixels corresponding to a pixel to be reduced and converted; a black line discriminating unit 107 extracts black lines from the extracted original image reference pixels; a black line centroid calculating unit 108 calculates the width and the centroid of each extracted black line; a converted black pixel determining unit 109 determines pixels for retaining the black lines, among four converted pixels around reference pixels on the basis of the width and the centroid of the black line determined by the black line centroid calculating unit 108; a converted black pixel storage unit 110 stores the densities of the converted pixels calculated by the converted black pixel determining unit 109; a converted pixel density calculating unit 111 calculates the densities of the presently objective converted pixels; a reduced image storage unit 112 stores a reduced image; an image output unit 113 gives the data of the reduced image to a CRT, a scanner and/or an external information device connected thereto through an interface; a display unit 114, such as a CRT, displays images; a printing unit 115, such as a printer, prints an image on a recording sheet; and an output interface 116 transfers the image to an external information device. Data is exchanged between the components of the image reducing system through a data bus 117.

In the image reducing system, the input image storage unit 104 may be connected through the image input unit 101 to the data bus 117. The reduced image storage unit 112 may be connected through the image output unit 113 to the data bus 117. The input image storage unit 104 and the reduced image storage unit 112 may be substituted by a single image storage unit. The input interface 103 and the output interface 116 may be substituted by a single I/O interface. The input image storage unit 104 may be provided with a magnetic disk apparatus, an optical disk apparatus, a magnetooptic disk apparatus or a CD-ROM. Similarly, the reduced image storage unit 112 may be provided with a magnetic disk apparatus, an optical disk apparatus or a magnetooptic disk apparatus.

The components of the image reducing system shown in FIG. 1 will be described hereinafter with reference to a flow chart, i.e., a problem analysis diagram.

When reducing an image, positions of converted pixels are determined on the basis of reduction ratios, and then a reference pixel block is determined. Then, the centroid of a black line to be extracted from the reference pixel block is determined by calculation or by making reference to a predetermined conversion table, and then a decision as to if the black line is to be retained is made on the basis of the relation between the position of the centroid of the black line in the reference pixel block and color information about four points around the reduced pixel in the reference pixel block.

Figure 2:
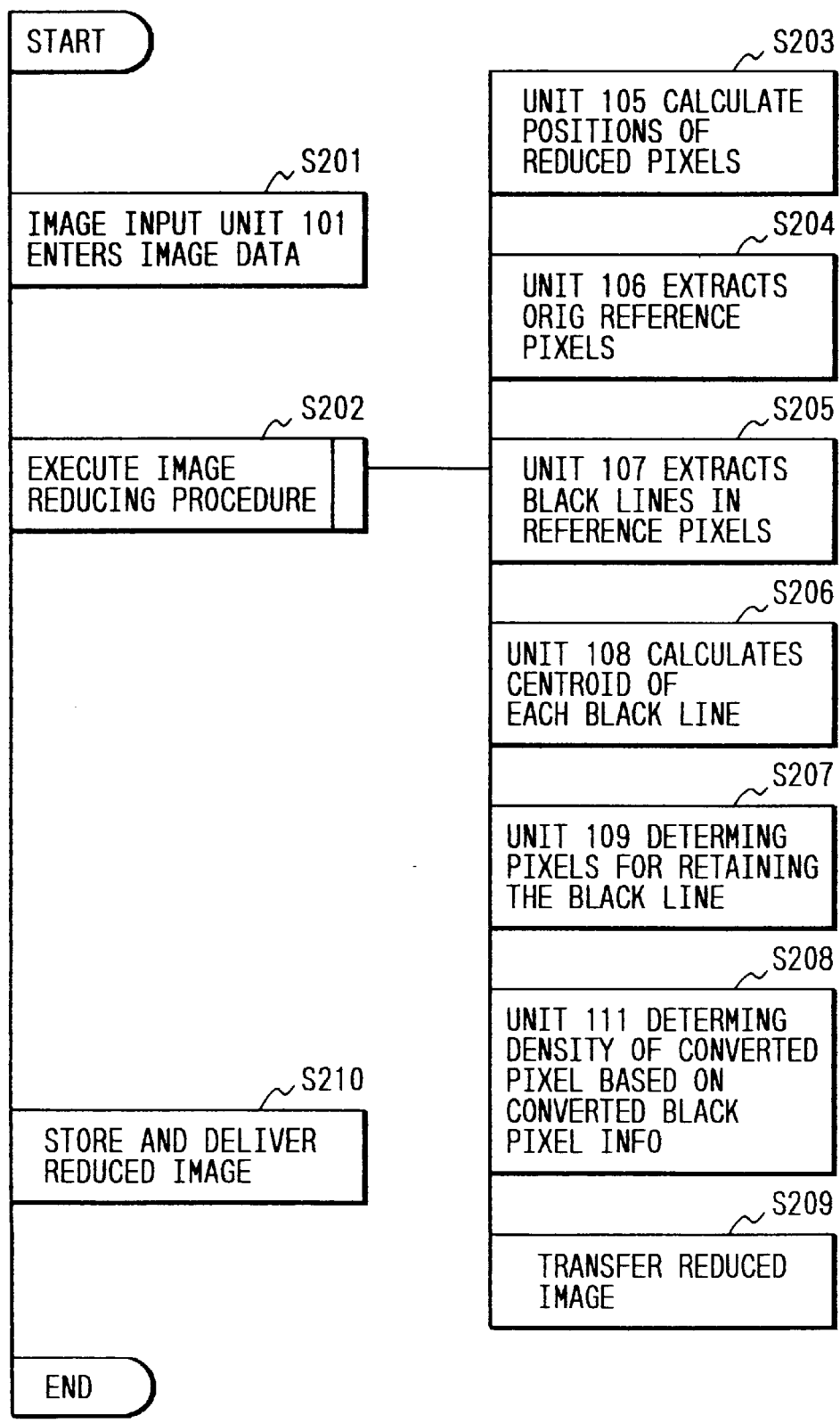
FIG. 2 is a Problem Analysis Diagram (PAD) of a procedure to be executed by the image reducing system in the first embodiment.

Referring to FIG. 2 showing a PAD representing an image reducing method in accordance with the present invention, the image input unit 101 (shown in FIG. 1) enters image data in step S201. The image data may be read through a network or the interface 103 from an external information device, may be acquired by the scanner, i.e., an image input apparatus or may be fetched from the input image storage unit 104. The input data may be encoded image data encoded by some image encoding method and the image input unit 101 may be capable of decoding the encoded image data. The reduction ratios are specified by operating the input unit 120. The reduction ratios may be specified in advance on the basis of the definition of the display of the display unit 114 and the size of the input original image.

Figure 3A:
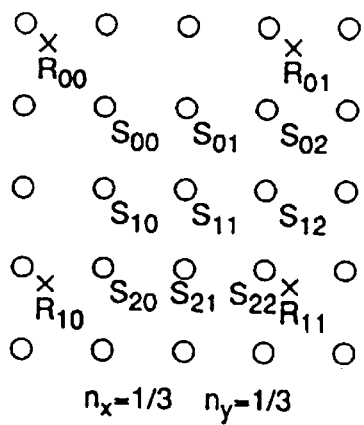
FIGS. 3A and 3B are diagrams for explaining original image reference blocks employed by the image reducing system in the first embodiment.
Figure 3B:
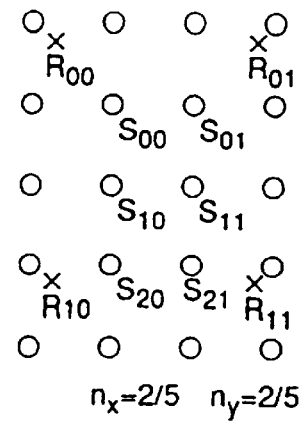

An image reducing procedure is executed in step S202 for the head data through the tail data of the image data. In the image reducing process, first the converted pixel position calculating unit 105 calculates the positions of reduced pixels relative to the original image pixel array in step S203. The reduced pixels are pixels of a reduced image. The positions of the reduced pixels can be determined on the basis of the reduction ratios. Original image reference pixels and reduced pixels are shown in FIGS. 3A and 3B by way of example. In FIGS. 3A and 3B, original image reference pixels indicated at $S_{pq}$ are represented by blank circles, and the reduced pixels indicated at $R_{rs}$ are represented by crosses. Supposing that the horizontal reduction ratio $n_x = 1/3$ and the vertical reduction ratio $n_y = 1/3$, the reduced pixels $R_{rs}$ are set at positions shown in FIG. 3A. The positions of the reduced pixels corresponding to the reduction ratios are specified for the converted pixel position calculating unit 105, and coordinate data indicating the positions of the determined reduced pixels $R_{rs}$ are stored in the converted pixel position calculating unit 105.

Then, the reference pixel extracting unit 106 extracts original image reference pixels for reduction by using the positions of the reduced pixels in the original image pixel array and the reduction ratios in step S204. The original image reference pixels are the pixels of the original image to which reference is made to retain black lines, and the reference pixel block is a block including pixels to which reference is made at a time. In the first embodiment, the reference pixel block is $w_x \times w_y$, where horizontal reference pixel width $w_x=1/n_x$ and vertical reference pixel width $w_y=1/n_y$, when the distance between the original pixels is 1 (one). A method of determining the reference pixel block will be described later.

The black line discriminating unit 107 extracts black lines in the reference pixels. The black line discriminating operation of the black line discriminating unit 107 will be described later.

Then, the black line centroid calculating unit 108 calculates the centroid of each black line in the original image reference pixels in step S206 on the basis of information about the black lines extracted by the black line discriminating unit 107. A method of calculating the centroid of the black line to be carried out by the black line centroid calculating unit 108 will be described later.

The converted black pixel determining unit 109 determines pixels for retaining the black line among four reduced pixels around the original image reference pixel in step S207 on the basis of the calculated centroid of the black line. A method of determining pixels for retaining the black lines to be carried out by the converted black pixel determining unit 109 will be described later.

Color information representing black or white and retained by making reference to four original image reference pixel blocks around one reduced pixel, to be used by the converted black pixel determining unit 109 for determining the color of the reduced pixel is stored for each original image reference pixel block for the reduced pixel in the converted black pixel storage unit 110 in step S207. The converted pixel density calculating unit 111 determines, in step S208, the density of the presently objective converted pixel on the basis of the converted black pixel information stored in the converted black pixel storage unit 110. A method of determining the density to be carried out by the converted pixel density determining unit 111 will be described later.

Those image reducing steps S203 through S209 are executed in step S202 for each converted pixel for all the image data. The steps S203 through S209 may be executed for all the image data of the image to be converted.

A reduced image thus obtained by the image reducing process is stored in the reduced image storage unit 112, is transferred through the image output unit 113 to the CRT 114 or a printer 115 or is sent through the interface 116 to an external information device in step S209. When sending the reduced image through the interface 116 to the external information device, the reduced image may be compressed by the image output unit 113 by a conventional image compressing method and the compressed image may be sent to the external information device.

The image reducing system may take the extracted black lines having a length shorter than an optionally determined length t for noise in the image and need not necessarily map such black lines to the reduced image. It is also possible that the image reducing system takes extracted horizontal fine black lines having a length shorter than $n/n_x+k$, where j and k are constants, and extracted vertical fine black lines having a length shorter than $h/n_y+i$, where h and i are constants, for noise in the image and the image reducing system does not map such fine black lines to the reduced image. Such a mode of operation of the image reducing system eliminates noise in the image and improves the quality of the reduced image effectively.

Original image reference pixels to be extracted by the image reducing system will be described hereinafter with reference to FIGS. 3A and 3B. FIG. 3A shows the positions of reduced pixels when the horizontal reduction ratio $n_x=\frac{1}{3}$ and the vertical reduction ratio $n_y=\frac{1}{3}$, and FIG. 3B shows the positions of reduced pixels when the horizontal reduction ratio $n_x=\frac{2}{5}$ and the vertical reduction ratio $n_y=\frac{1}{3}$. A block defined by four reduced pixels is an original image reference pixel block. Suppose that the starting point of the original image reference pixel is a pixel $S_{00}$ on the lower right-hand side of a pixel $R_{00}$ and that a square block including pixels $S_{00}$ to $S_{02}$ on the right-hand side of the pixel $S_{00}$ and on the lower left-hand side of the next reduced pixel $R_{01}$, and pixels $S_{00}$ to $S_{03}$ under the pixel $S_{00}$ and on the upper right-hand side of the next reduced pixel $R_{10}$ is a reference pixel block. In FIG. 3A, a square block including the pixels $S_{00}$ to $S_{22}$ is an original image reference pixel block. In FIG. 3B, a square block including pixels $S_{00}$ to $S_{21}$ is an original image reference pixel block. In this case, reference is made to the reference pixel block when determining reduced pixels $R_{00}$, $R_{01}$, $R_{10}$ and $R_{11}$. The reference pixel extracting unit 106 holds coordinate data representing the positions of the determined original image reference pixels.

Figure 19:
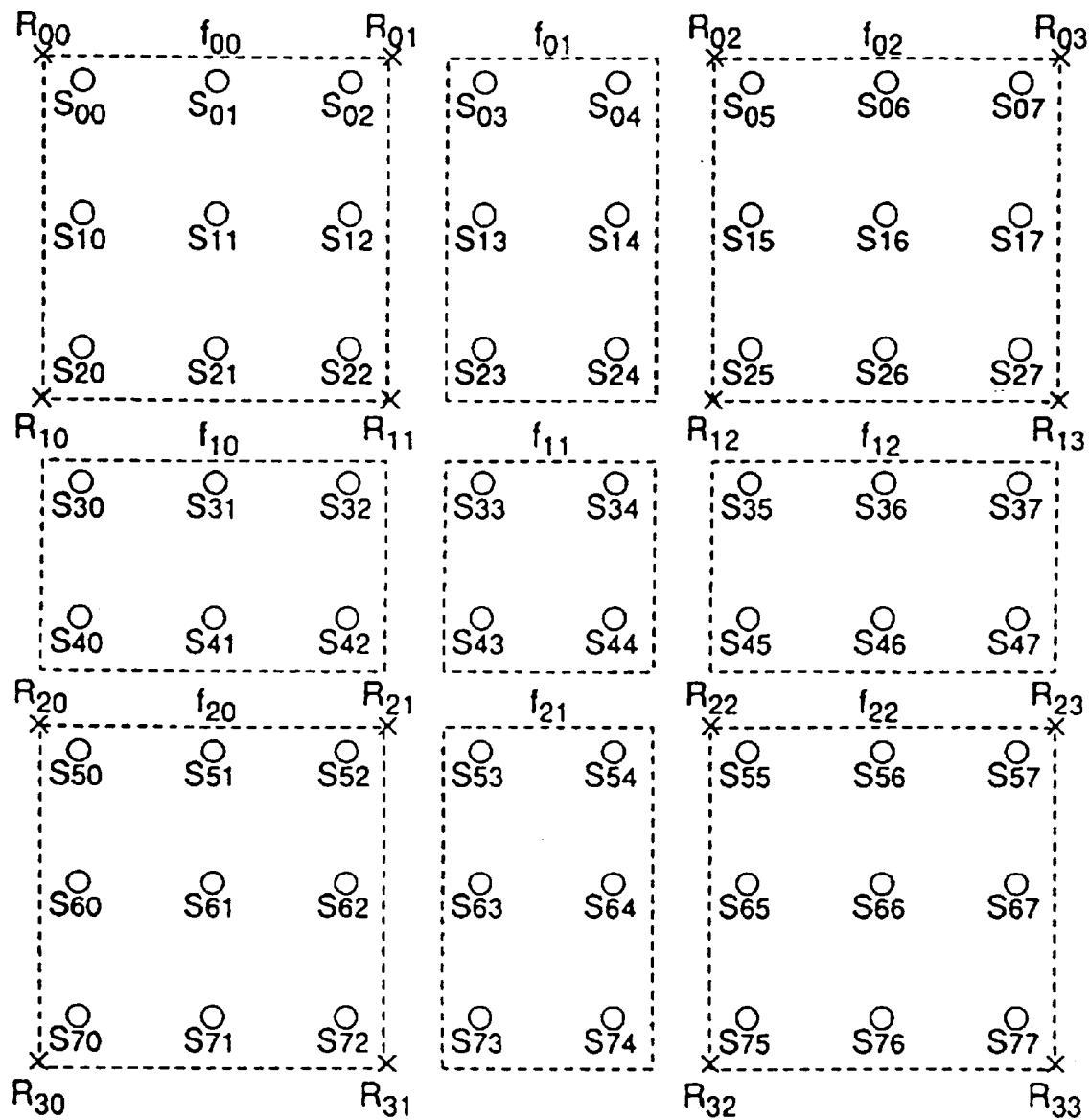
FIG. 19 is a diagram for explaining the variation in size of reference image pixel blocks for image reduction in an optional reduction ratios.

In another method of determining the reference pixel block, the reference pixel block need not be fixed; different reference pixel blocks may be determined for different reduced pixels. This method of determining reference pixel blocks will be described with reference to FIG. 19 showing a reducing unit for reducing an image in optional reduction ratios by cyclically changing the size of reference pixel blocks. In FIG. 19, original image reference pixels are indicated at $S_{pq}$, reduced pixels are indicated at $R_{rs}$, and original image reference pixel blocks corresponding to the reduced pixels $R_{rs}$ are indicated at $f_{rs}$. In the case shown in FIG. 19, the horizontal reduction ratio $n_x=\frac{2}{5}$ and the vertical reduction ratio $n_y=\frac{2}{5}$. Original image reference pixel blocks each having three reference pixels on each horizontal row and original image reference pixel blocks each having two reference pixels on each horizontal row are arranged alternately in the horizontal direction, and original image reference pixel blocks each having three reference pixels on each vertical row and original image reference pixel blocks each having two reference pixels on each vertical row are arranged alternately in the vertical direction to realize the desired horizontal and vertical reduction ratios without the duplicate use of the reference pixels. In this embodiment, a reference pixel block $f_{00}$ for a reduced pixel $R_{00}$ includes nine original image reference pixels $S_{00}$ to $S_{22}$m, a reference pixel block $f_{01}$ for a reduced pixel $R_{01}$ includes six original image reference pixels $S_{03}$ to $S_{24}$, a reference pixel block $f_{10}$ for a reduced pixel $R_{10}$ includes six original image reference pixels $S_{30}$ to $S_{42}$, and a reference pixel block $f_{11}$ for a reduced pixel $R_{11}$ includes four original image reference pixels $S_{33}$ to $S_{44}$. Generally, image reduction in optional reduction ratios without the duplicate use of original image pixels can be realized by cyclically changing the number of pixels on the horizontal rows and that of pixels on the vertical rows of the reference pixel blocks.

A black line discriminating method to be carried out by the black line discriminating unit 107 will be described hereinafter with reference to FIGS. 22 and 23.

Figure 22A:
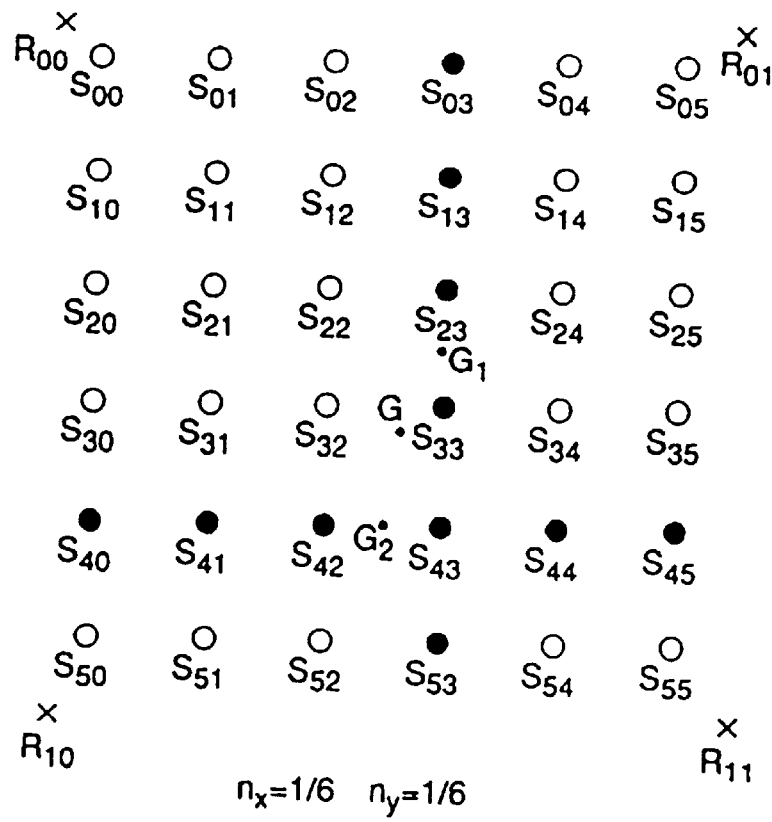
FIGS. 22A and 22B are diagrams for explaining a method of determining black pixels when an original image reference block includes a plurality of fine black lines to be carried out by the image reducing system in the first embodiment.
Figure 22B:
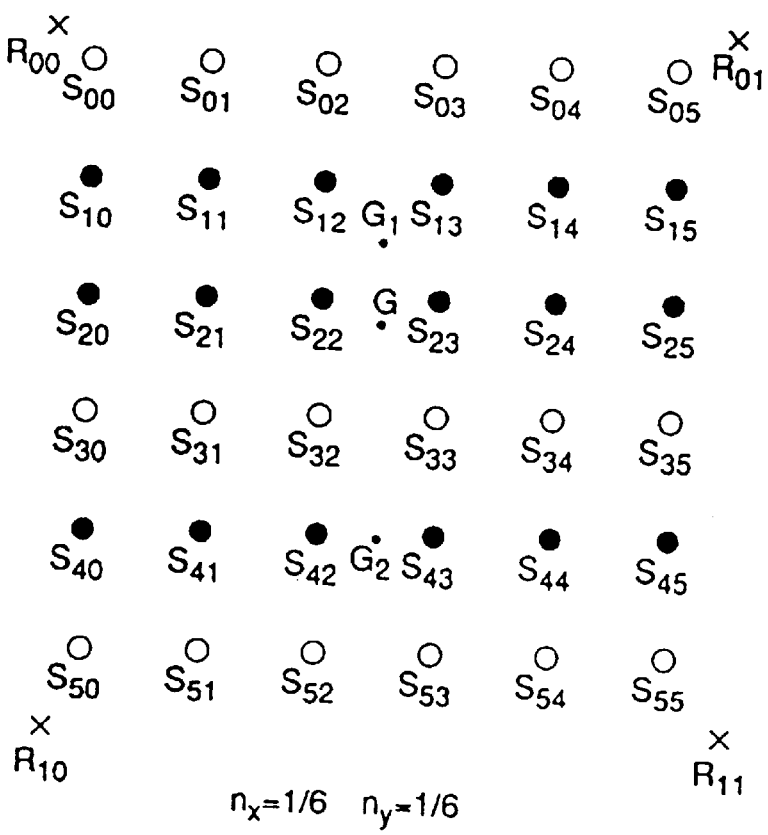

Referring to FIG. 22 showing an original image reference pixel block including a plurality of fine black lines, original image reference pixels indicated at $S_{pq}$ are represented by circles and reduced pixels indicated at $R_{rs}$ are represented by crosses. In FIGS. 22A and 22B, the horizontal reduction ratio $n_x=\frac{1}{6}$ and the vertical reduction ratio $n_y=\frac{1}{6}$. In FIG.

22A, pixels $S_{40}$ to $S_{45}$ on a horizontal row and pixels $S_{03}$ to $S_{53}$ on a vertical row are black pixels, and the rest are white pixels. In FIG. 22B, pixels $S_{10}$ to $S_{15}$, $S_{20}$ to $S_{25}$ and $S_{50}$ to $S_{45}$ are black pixels and the rest are white pixels. Indicated at G are respective centroids of the black lines.

A continuous black line extending across the upper end and the lower end of the block is taken for a vertical black line. A continuous black line extending across the left-hand end and the right-hand end of the block is taken for a horizontal black line. When the horizontal reduction ratio $n_x=\frac{1}{6}$ and the vertical reduction ratio $n_y=\frac{1}{6}$ as shown in FIG. 22, it is decided that pixels $S_{0x}$ to $S_{5x}$ form a vertical black line when all the pixels $S_{0x}$ to $S_{5x}$ are black and, similarly, it is decided that pixels $S_{y0}$ to $S_{y5}$ form horizontal black line when all the pixels $S_{y0}$ to $S_{y5}$ are black.

In FIG. 22A, according to the foregoing criterional conditions, it is decided that pixels $S_{03}$ to $S_{53}$ form a vertical black line, and pixels $S_{40}$ to $S_{45}$ form a horizontal black line. In FIG. 22B, it is decided that pixels $S_{10}$ to $S_{15}$ and pixels $S_{20}$ to $S_{25}$ form adjacent, fine, horizontal black lines forming one horizontal black line, and pixels $S_{40}$ to $S_{45}$ form a horizontal black line.

Figure 23:
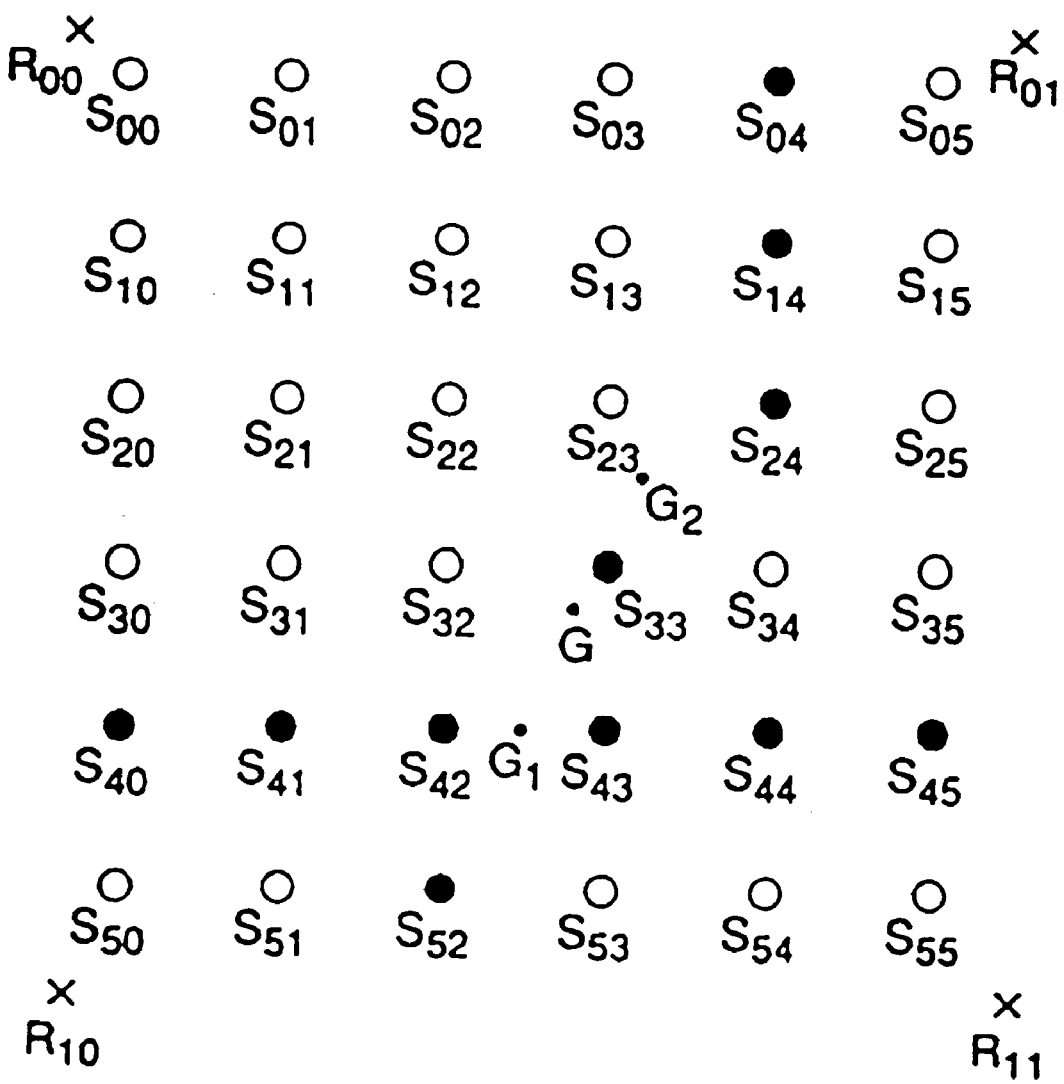
FIG. 23 is a diagram for explaining a method of determining black pixels when an original image reference pixel block includes a plurality of fine black lines to be carried out by the image reducing system in the first embodiment.

Referring to FIG. 23 showing an original image reference pixel block including a plurality of fine black lines, original image reference pixels indicated at $S_{pq}$ are represented by circles and reduced pixels indicated at $R_{rs}$ are represented by crosses. In FIG. 23, the horizontal reduction ratio $n_x=\frac{1}{6}$ and the vertical reduction ratio $n_y=\frac{1}{6}$, pixels $S_{40}$ to $S_{45}$ on a horizontal row and pixels $S_{04}$, $S_{14}$, $S_{24}$, $S_{33}$ and $S_{52}$ are black pixels and the rest are white pixels. The respective centroids of black lines are indicated at G.

Successive black pixels on an oblique line inclined to a vertical line and extending across the upper end and the lower end of the block form longitudinal, oblique black line, and successive black pixels on an oblique line inclined to a horizontal line and extending across the left-hand end to the right-hand end form lateral, oblique black line. A pixel and another pixel adjacent to the former and at a position other than positions above, under, on the right-hand side and on the left-hand side of the former are obliquely successive pixels. In FIG. 23, supposing that a pixel $S_{23}$ is a marked pixel, pixels $S_{12}$, $S_{14}$, $S_{32}$ and $S_{34}$ are at positions to form oblique lines together with the pixel $S_{23}$, respectively. When the horizontal reduction ratio $n_x=\frac{1}{6}$, the vertical reduction ratio $n_y=\frac{1}{6}$ and pixels $S_{0k}$ to $S_{51}$ are arranged successively on an oblique line inclined to a vertical line, it is decided that the pixels $S_{0k}$ to $S_{51}$ form a longitudinal, oblique black line. Similarly, when black pixels $S_{j0}$ to $S_{j5}$ are arranged successively on an oblique line inclined to a horizontal line, it is decided that the pixels $S_{j0}$ to $S_{j5}$ form a lateral, oblique black line.

In FIG. 23, it is decided, according to the foregoing criterional conditions for determining black lines, that pixels $S_{04}$, $S_{14}$, $S_{24}$, $S_{33}$, $S_{42}$ and $S_{52}$ form a longitudinal, oblique black line and that pixels $S_{40}$ to $S_{45}$ form a horizontal black line.

A method of calculating the centroid of a black line to be carried out by the black line centroid calculating unit 108 will be described hereinafter with reference to FIGS. 4A, 4B, 4C and 5.

Figure 4A:
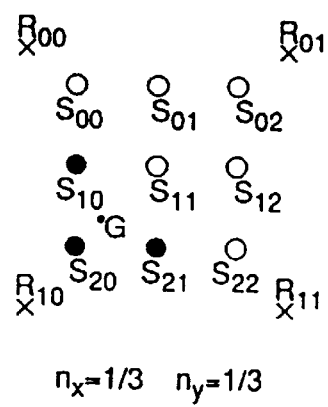
FIGS. 4A, 4B and 4C are diagrams for explaining a method of determining the centroid of a black line and a pixel at which the black line is to be retained to be carried out by the image reducing system in the first embodiment.
Figure 4B:
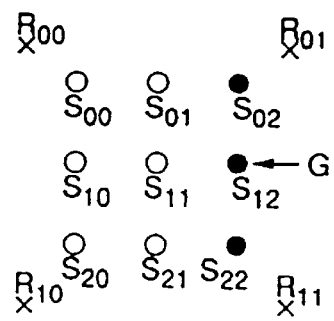
Figure 4C:
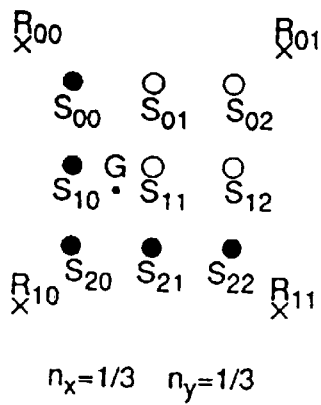

Referring to FIGS. 4A, 4B and 4C showing the centroids of black lines in an original image reference pixel block, and pixels for determining black line retention pixels among reduced pixels, original image reference pixels are indicated at $S_{pq}$ and reduced pixels are indicated at $R_{rs}$. In FIG. 4A, original image reference pixels $S_{10}$, $S_{20}$ and $S_{21}$ are black pixels and the rest are white pixels. In FIG. 4B, original image reference pixels $S_{02}$, $S_{12}$ and $S_{22}$ are black pixels and the rest are white pixels. In FIG. 4(c), original image reference pixels $S_{00}$, $S_{10}$, $S_{20}$, $S_{21}$ and $S_{22}$ are black pixels and the rest are white pixels. The respective centroids of black lines are indicated at G. In this case, the horizontal reduction ratio $n_x=\frac{1}{3}$ and the vertical reduction ratio $n_y=\frac{1}{3}$.

When calculating the centroid of a black line, the vertical distance and the horizontal distance of each black pixel from a specified point in an original image reference pixel block are measured in pixel unit, all the vertical distances and all the horizontal distances are added up respectively, and the addition of the vertical distances and that of the horizontal distances are divided by the number of black pixels. For example, in the case of an original image reference pixel block as shown in FIG. 4A, supposing that a pixel $S_{00}$ is a specified point, the respective vertical distances of black pixels $S_{10}$, $S_{20}$ and $S_{21}$ from the specified pixel $S_{00}$ are one pixel, two pixels and three pixels and the respective horizontal distances of the same from the specified pixel $S_{00}$ are zero pixel, zero pixel and one pixel. Accordingly, the distance of the centroid G with respect to a vertical direction from the specified pixel $S_{00}$ is $(1+2+2)/3=\frac{5}{3}$ pixels and the distance of the same with respect to a horizontal direction from the specified pixel $S_{00}$ is $(0+0+1)/3=\frac{1}{3}$ pixels. The black line centroid calculating unit 108 thus calculates the positions of the respective centroids of all the black lines and retains coordinate data of the centroids.

A black line retaining pixel determining method to be carried out by the converted black pixel determining unit 109 will be described hereinafter. The converted black pixel determining unit 109 retains black pixel information at a reduced pixel nearest to the centroid of each black line in the reference pixel block. A retaining position for a case in which the centroid is at the center of two or more reduced pixels is determined beforehand. In this embodiment, it is specified to retain black pixel information at an upper reduced pixel with respect to a vertical direction and to retain black pixel information at a reduced pixel on the left-hand side with respect to a horizontal direction. In case the black line discriminating unit 107 has decided that there are a plurality of black lines in the reference pixel block, each black line is retained as black pixels at a reduced pixel. It is also possible, when it is decided that there are a plurality of black lines in the reference pixel block, to calculate the positions of the respective centroids of all the black lines in the reference pixel block and to retain black pixel information at reduced pixels nearest to the centroids.

For example, in FIG. 4A, in which the centroid of the black line is at G, a black line of black pixels $S_{02}$, $S_{12}$ and $S_{22}$ is retained at (mapped to) a reduced pixel $R_{10}$, In FIG. 4B, in which the centroid of the black line is at G on a pixel $S_{12}$, a fine black line of $S_{02}$, $S_{12}$ and $S_{22}$ is retained at (mapped to) a reduced pixel $R_{01}$. In FIG. 4C, in which the centroid of the black line is at G, a fine black line of pixels $S_{00}$, $S_{10}$ and $S_{20}$ and a fine black line of pixels $S_{20}$, $S_{21}$, and $S_{22}$ are regarded as two separate fine black lines, and the fine black line of pixels $S_{00}$, $S_{10}$ and $S_{20}$ and the fine black line of pixels $S_{20}$, $S_{21}$, and $S_{22}$ are retained at (mapped to) a reduced pixel $R_{00}$ and a reduced pixel $R_{10}$, respectively. In an example shown in FIG. 22A, according to the foregoing criterional conditions for determining black lines, it is decided that there are a vertical black line of pixels $S_{03}$ to $S_{53}$ having a centroid $G_1$ and a horizontal black line of pixels $S_{40}$ to $S_{45}$ having a centroid $G_2$, the vertical black line is retained at a reduced pixel $R_{01}$, and the horizontal black line is retained at a reduced pixel $R_{10}$. In an example shown in FIG.

22B, two horizontal black lines of pixels $S_{10}$ to $S_{15}$ and pixels $S_{20}$ to $S_{25}$ having a centroid $G_1$ are retained at a reduced pixel $R_{00}$, and a black line of pixels $S_{40}$ to $S_{45}$ having a centroid $G_2$ is retained at a reduced pixel $R_{10}$. In an example shown in FIG. 23, a longitudinal, oblique black line of pixels $S_{04}$, $S_{14}$, $S_{24}$, $S_{33}$, $S_{42}$ and $S_{52}$ having a centroid $G_2$ is retained at a reduced pixel $R_{01}$ and a horizontal black line of pixels $S_{40}$ to $S_{45}$ having a centroid $G_1$ is retained at a reduced pixel $R_{10}$. When it is specified to calculate the centroid of all the black pixels in the reference pixel block and to retain black pixel information at a black pixel nearest to the centroid, the black pixel information is retained at a reduced pixel $R_{11}$ nearest to the centroid of all the black pixels in the reference pixel block.

Figure 26:
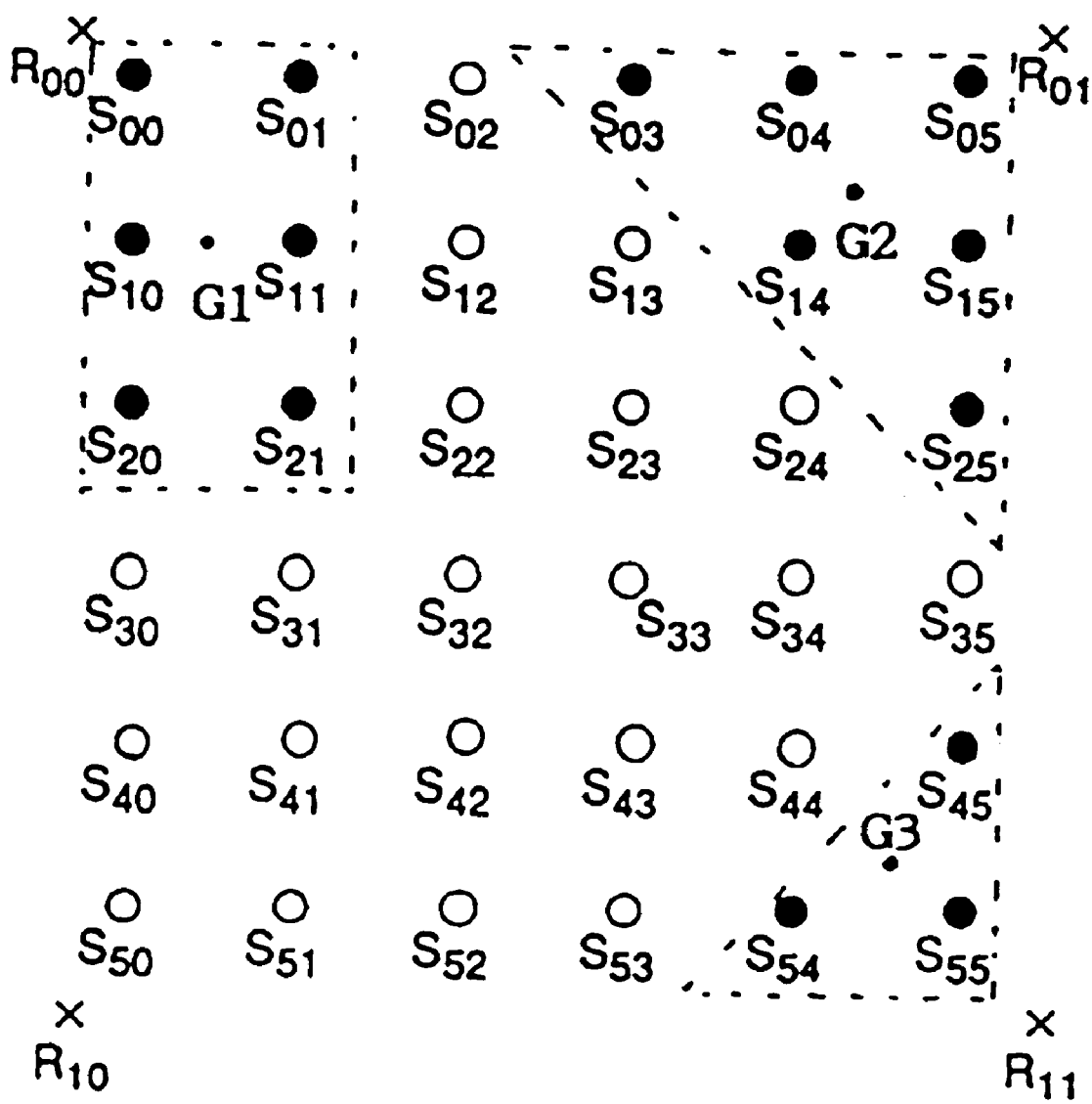
FIG. 26 is a diagram for explaining a method of determining black pixels when an original image reference pixel block includes a plurality of fine black lines to be carried out by the image reducing system in the first embodiment.

Another method of discriminating black lines and retaining the same will be described with reference to FIG. 26. Although, black lines each of successive black pixels extending across the upper end and the lower end of the reference pixel block or across the left-hand end and the right-hand end of the reference pixel blocks shown in FIGS. 22A, 22B and 23 are regarded as vertical black lines when discriminating longitudinal and lateral oblique black lines in the reference pixel blocks shown in FIGS. 22A, 22B and 23, it is also possible to decide that there is a black line in the reference pixel block when the reference pixel block includes at least one black pixel. For example, FIG. 26 shows a reference pixel block in which original image reference pixels indicated at $S_{pq}$ are represented by circles, reduced pixels indicated at $R_{rs}$ are represented by crosses, the horizontal reduction ratio $n_x=\frac{1}{6}$ and the vertical reduction ratio $n_y=\frac{1}{6}$. In the reference pixel block shown in FIG. 26, black pixel groups of black pixels enclosed by broken lines are regarded as individual black lines; that is, the individual longitudinal, lateral and oblique black pixel groups are recognized as black lines, and the respective centroids of the black pixel groups are determined. In FIG. 26, the black pixel group of black pixels $S_{00}$, $S_{01}$, $S_{10}$, $S_{11}$, $S_{20}$ and $S_{21}$ has a centroid $G_0$ and is retained at a pixel $R_{00}$, the black pixel group of black pixels $S_{03}$, $S_{04}$, $S_{05}$, $S_{14}$, $S_{15}$ and $S_{25}$ has a centroid $G_2$ and is retained at a pixel $R_{01}$, and the black pixel group of black pixels $S_{45}$, $S_{54}$ and $S_{55}$ has a centroid $G_3$ and is retained at a pixel $R_{11}$.

It may be decided that the black line is to be retained, when the number of the black pixels of the black pixel group is equal to or greater than a predetermined number n (natural number). In the case of FIG. 26, the black pixel group having the centroid $G_1$ is retained at the pixel $R_{00}$, the black pixel group having the centroid $G_2$ is retained at the pixel $R_{01}$, and the black pixel group having the centroid $G_3$ is retained at the pixel $R_{11}$ when $n \leq 3$, the black pixel group having the centroid $G_1$ is retained at the pixel $R_{00}$, the black pixel group having the centroid $G_2$ is retained at the pixel $R_{01}$ and the black pixel group having the centroid $G_3$ is not retained when $3 \leq n \leq 6$, and none of the black pixels is retained when $6<n$. Such a method of retaining the black pixels is effective in preventing the deterioration of the gradation of the image and eliminating noise.

Figures 5A, 5B:
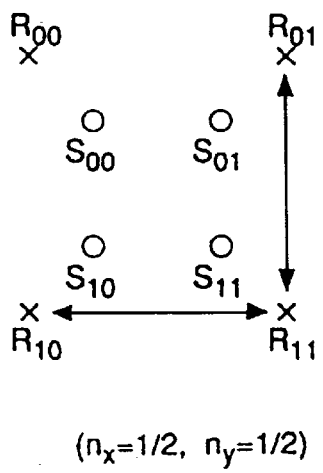
FIGS. 5A and 5B are a diagram and a table, respectively, for explaining a method of determining a pixel at which a black line is to be retained, by table matching to be carried out by the image reducing system in the first embodiment.

In the steps S205 through the step S207 of the image reducing procedure in this embodiment, reduced pixel conversion tables shown in FIGS. 5B and 6B are used for table matching. FIGS. 5A and 5B are a diagrams and a table of assistance in explaining a black line retaining pixel determining procedure using table matching in the first embodiment.

FIG. 5A shows the positional relation between original image reference pixels $S_{pq}$ and reduced pixels $R_{rs}$, in which the horizontal reduction ratio $n_x=\frac{1}{2}$ and the vertical reduction ratio $n_y=\frac{1}{2}$. FIG. 5B is a reduction pixel table showing colors to be retained at reduced pixels $R_{00}$ to $R_{11}$ when the colors (0=white, 1=black) of original image reference pixels $S_{00}$ to $S_{11}$ are given. In the table shown in FIG. 5B, the colors of the pixels $S_{00}$ to $S_{11}$ are addresses, and the colors of the pixels $R_{00}$ to $R_{11}$ are data. The number of data is sixteen, and each of the addresses and the data are represented by a 4-bit value. The pieces of color information abut the pixels $R_{00}$ to $R_{11}$ may be defined beforehand by the aforesaid method. Thus, the colors of the reduced pixels can be determined according to the colors of the reference pixels.

FIGS. 6A and 6B are a diagram and a table of assistance in explaining another black line retaining pixel determining procedure using table matching in this embodiment. FIG. 6A shows the positional relation between original image reference pixels $S_{pq}$ and reduced pixel $R_{rs}$, in which the horizontal reduction ratio $n_x=\frac{1}{2}$ and the vertical reduction ratio $n_y=\frac{1}{3}$.

FIG. 6B is a reduced pixel conversion table showing the colors of reduced pixels $R_{00}$ to $R_{11}$ when the colors (0=white, 1=black) of original reference pixels $S_{00}$ to $S_{11}$ are given.

In the reduced pixel conversion table shown in FIG. 6B, the colors of the pixels $S_{00}$ to $S_{11}$ are used as addresses, and the pixels $R_{00}$ to $R_{11}$ are data. The number of the data is sixty-four, each address is represented by a 6-bit value and each data is represented by a 4-bit value.

Thus, the colors of the reduced pixels are specified beforehand on the basis of the colors, i.e., black or white, of the corresponding original image reference pixels. The determination of black lines by the black line discriminating unit 107, the calculation of centroids by the black line centroid calculating unit 108 and the determination of pixels for retaining black lines by the converted black pixel determining unit 109 can be achieved by table matching using the table shown in FIG. 6B, in which the reduced pixel conversion table is stored in the converted black pixel determining unit 109 for batch processing. The reduced pixel determining method which retains black lines by table matching is able to achieve the conversion process faster than the reduced pixel determining method which retains black lines by calculation.

Figure 7:
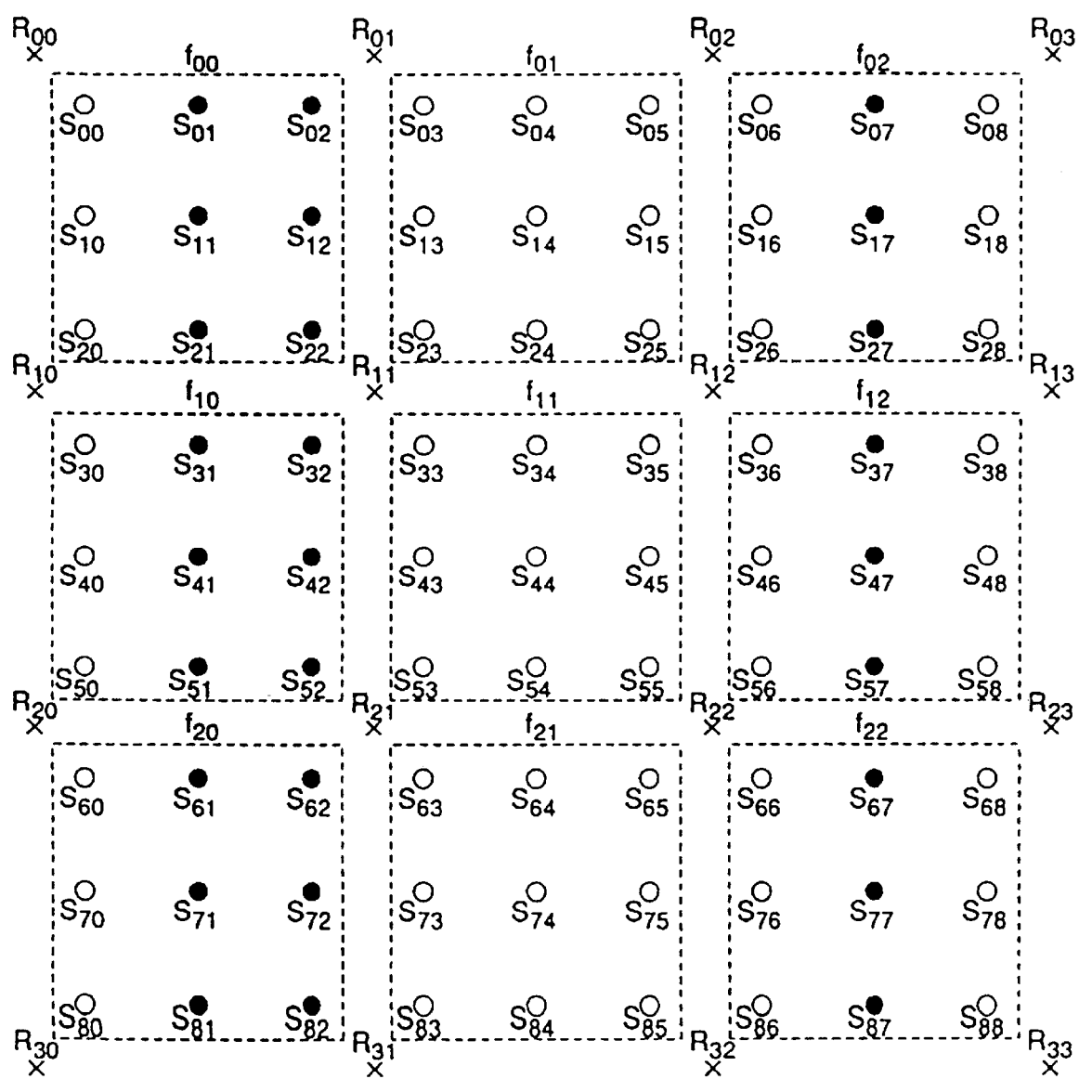

FIG. 7 is a diagram which provides assistance in explaining reduced pixel density calculation, by way of example, to be executed by the image reducing system according to the first embodiment of the present invention. In FIG. 7, original image reference pixels are indicated at $S_{pq}$, reduced pixels are indicated at $R_{rs}$, the horizontal reduction ratio $n_x=\frac{1}{3}$ and the vertical reduction ratio $n_y=\frac{1}{3}$. Original image reference pixels $S_{01}$ to $S_{71}$, $S_{02}$ to $S_{72}$ and $S_{07}$ to $S_{87}$ on vertical rows are black pixels and the rest are white pixels. Indicated at $f_{00}$ to $f_{22}$ are original image reference pixel blocks respectively corresponding to reduced pixels $R_{00}$ to $R_{22}$.

A reduced pixel density calculating method will be described hereinafter. First, the colors of the four reduced pixels at the four corners of each original image reference pixel block are determined by table matching on the basis of reference pixels included in the original image reference pixel block by the aforesaid procedure. For example, the colors of reduced pixels $R_{00}$, $R_{01}$, $R_{10}$ and $R_{11}$ at the corners of the original image reference pixel block $f_{00}$ are determined and the colors of the reduced pixels $R_{00}$, $R_{01}$, $R_{10}$ and $R_{11}$ are indicated at $R_{01}(f_{00})$, $R_{01}(f_{00})$, $R_{10}(f_{00})$ and $R_{11}(f_{00})$. Similarly, the colors $R_{01}(f_{01})$, $R_{02}(f_{01})$, $R_{11}(f_{01})$ and $R_{12}(f_{01})$ of the reduced pixels $R_{01}$, $R_{02}$, $R_{11}$, and $R_{12}$ associated with the original image reference pixel block $f_{01}$ are determined. The density of each reduced pixel is represented by the logical OR of the colors of the reduced pixel determined by the four original image reference pixel blocks around the reduced pixel. For example, the color of the reduced pixel $R_{11}$ is determined by using the following expression.

$$R_{11}=R_{11}(f_{00})+R_{11}(f_{10})+R_{11}(f_{10})+R_{11}(f_{11}) \quad (1)$$

wherein "+" is a symbol of logical OR operation.

Similarly, the color of the reduced pixel $R_{12}$ is determined by using the following expression.

$$R_{12}=R_{12}(f_{01})+R_{12}(f_{02})+R_{12}(f_{11})+R_{12}(f_{12}) \quad (2)$$

Thus, the color of each reduced pixel is determined on the basis of information about the pixels included in the four reference pixel blocks around the reduced pixel.

Since the black lines of each reference pixel block are discriminated to determine reduced pixels to be retained when reducing an image, reference is made to each reference pixel block only once, so that the image reducing system in the first embodiment of the present invention is able to carry out the reduced image processing operation faster than the conventional image reducing system.

Figure 8:
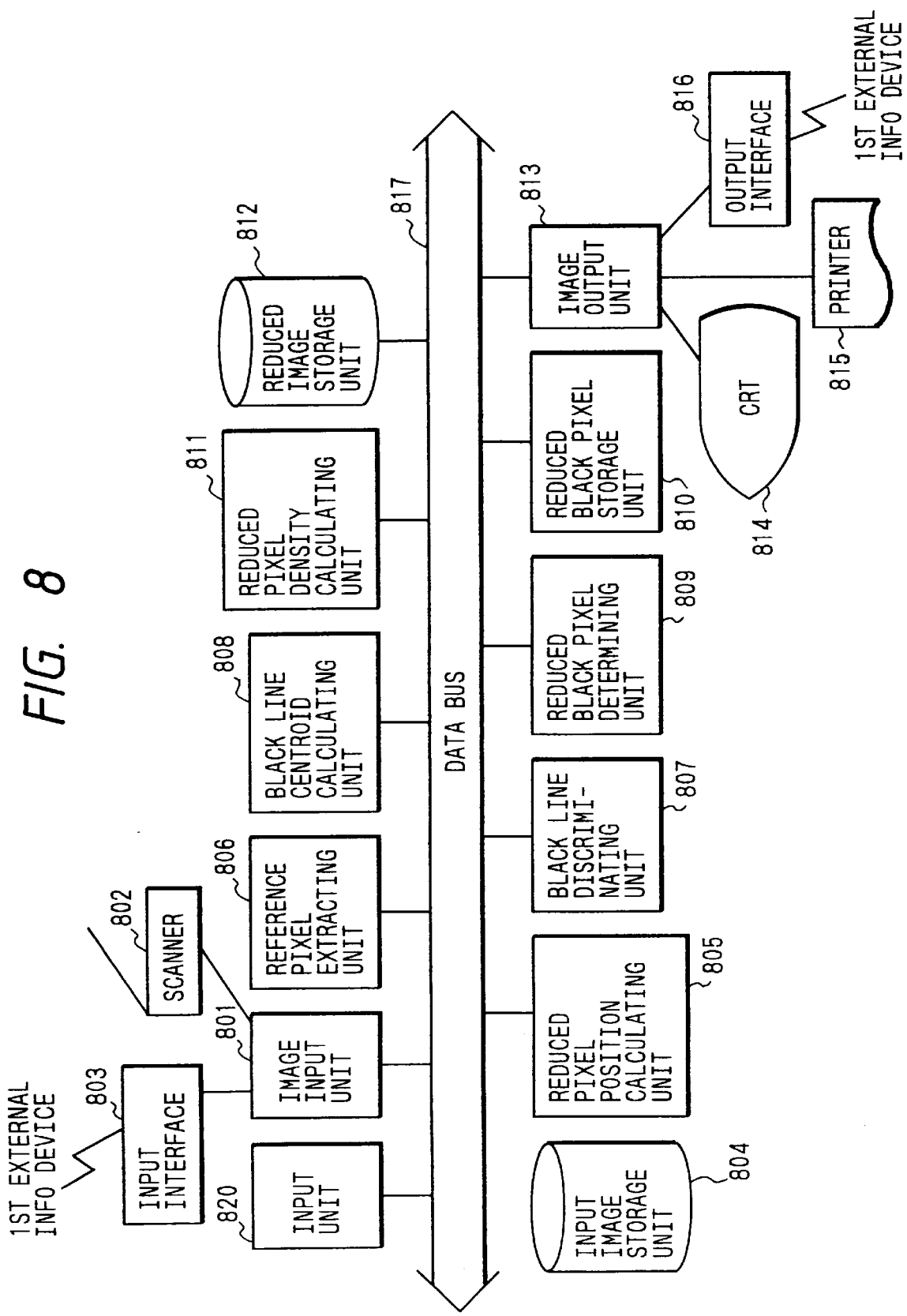
FIG. 8 is a block diagram of an image reducing system in a second embodiment according to the present invention.

An image reducing system in a second embodiment according to the present invention will be described herein after with reference to FIG. 8. Referring to FIG. 8, an image input unit 801 receives image data through a network or an interface; a scanner 802 scans a recording sheet or the like to read image data; an input interface 803 receives image data from an external information device; an input unit 820 accepts instructions including reduction ratios; an input image storage unit 804 stores input image data; reduced pixel position calculating unit 805 calculates the positions of reduced pixels to be converted relative to an original image pixel array; a reference image extracting unit 806 extracts original image reference pixels corresponding to a pixel to be reduced and converted; a black line discriminating unit 807 extracts black lines from the extracted original image reference pixels; a black line centroid calculating unit 808 calculates the width and the centroid of each extracted black line; a converted black pixel determining unit 809 determines pixels for retaining the black lines, among reference pixels and converted pixels around reference pixels on the basis of the width and the centroid of the black line determined by the black line centroid calculating unit 808; a converted black pixel storage unit 810 stores the densities of the converted pixels calculated by the converted black pixel determining unit 809; a converted pixel density calculating unit 811 calculates the densities of the presently objective converted pixels; a reduced image storage unit 812 stores a reduced image; an image output unit 813 gives the data of the reduced image to a CRT, a scanner and/or an external information device connected thereto through an interface; a display unit 814, such as a CRT, displays images; a printing unit 815, such as a printer, prints an image on a recording sheet; and an output interface 816 transfers the image to an external information device. Data is exchanged between the components of the image reducing system through a data bus 817.

The input image storage unit 804 may be connected through the image input unit 801 to the data bus 817. The reduced image storage unit 812 may be connected through the image output unit 813 to the data bus 817. The input interface 103 and the output interface 116 may be substituted by a single I/O interface. The input image storage unit 804 may be provided with a magnetic disk apparatus, an optical disk apparatus, a magnetooptic disk apparatus or a CD-ROM. Similarly, the reduced image storage unit 812 may be provided with a magnetic disk apparatus, an optical disk apparatus or a magnetooptic apparatus.

The operations of the components of the image reducing system of FIG. 8 will be described hereinafter with reference to a PAD. The image reducing system in the second embodiment determines the positions of converted pixels first on the basis of the reduction ratios, and then determines a reference pixel block. A reference pixel block is specified beforehand. Then, the centroid and the width of a black line to be extracted from the reference pixel block, the centroid of the black line in the reference pixel block is determined by calculation or by making reference to a predetermined conversion table, and then a decision as to if the black line is to be retained is made on the basis of the relation between the position of the centroid and the width of the black line in the reference pixel block, and four reference pixel blocks around a reduced pixel.

In the second embodiment, the widths of reduced fine lines, i.e., fine lines of a reduced image, are determined on the basis of the widths of lines in an original image. Concretely, the black line discriminating unit 807 discriminates a black line and determines the width of the black line, and the converted black pixel determining unit 809 determines color information about the reduced pixel on the basis of the result of discrimination and the width of the black line. The reference pixel block is $(u+1)w_x \times (v+1)w_y$, where u and v are optional natural numbers, while the reference pixel block employed in the first embodiment is $w_x \times w_y$. The widths of fine lines having widths down to a lateral line width $d_x = u \times w_x$ and those of fine lines having widths down to a longitudinal line width $d_y = v \times w_y$ are determined map the fine line by uniquely determining the line width of the reduced image.

Figure 9:
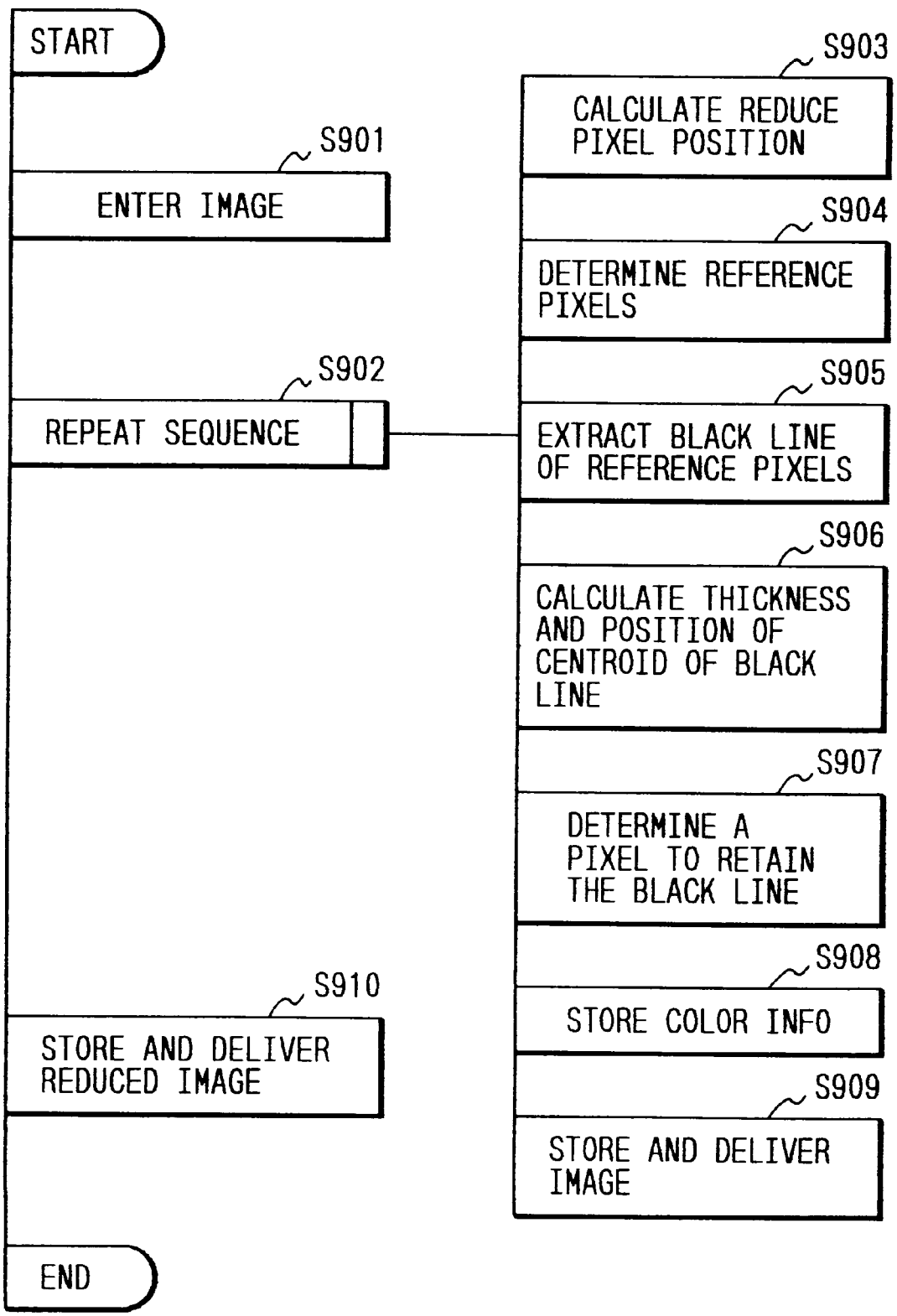
FIGS. 9 is a PAD of a procedure to be executed by the image reducing system in the second embodiment.

Referring to FIG. 9 showing a PAD representing an image reducing method in a preferred embodiment according to the present invention, an image data is entered by the image input unit 801 in step S901. The input image data may be read through a network or the interface 803 from an external information device, may be acquired by the scanner 802, i.e., an image input apparatus or may be fetched from the input image storage unit 804. The input image data may be encoded image data encoded by some encoding method and may be decoded by the image input unit 801. The reduction ratios are specified by operating the input unit 820. The reduction ratios may be specified beforehand on the basis of the definition of the display of the display unit 814 and the size of the input original image.

An image reducing procedure is executed in step S902 for the head data through the tail data of the image data. In the image reducing process, first the converted pixel position calculating unit 805, similarly to the converted pixel position calculating unit of the image reducing system in the first embodiment, calculates the positions of reduced pixels relative to an original image pixel array in step S903. Then, the reference pixel extracting unit 806 determines an original image reference pixels for image reduction by using the positions of the reduced pixels relative to the original image pixel array, and the reduction ratios in step S904. FIGS. 10A and 10B show original image reference pixel blocks by way of example.

In FIGS. 10A and 10B, original image reference pixels are indicated at $S_{pq}$, reduced pixels are indicated at $R_{rs}$, and a converted pixel to be subjected to an image reduction process is indicated at $R_{00}$. In FIG. 10A, the horizontal reduction ratio $n_x=\frac{1}{3}$ and the vertical reduction ratio $n_y=\frac{1}{3}$. In FIG. 10B, the horizontal reduction ratio $n_x=\frac{2}{5}$ and the vertical reduction ratio $n_y=\frac{1}{3}$. When retaining fine lines having widths down to a lateral line width $d_x=[1/n_x]$ and fine lines having widths down to a longitudinal width $d_y=[1/n_y]$, where [ ] indicates the rounding up of the decimal part of a value (for example, [a] is an integral number i meeting i≧a>i−1), as shown in FIGS. 10A and 10B, a square original image reference pixel block is defined by $4 \times w_x \times w_y$ original image pixels, namely, $w_x$ original image pixels on the left-hand side of the pixel $R_{00}$, $w_x$ original image pixels on the right-hand side of the pixel $R_{00}$, $w_y$ original image pixels on the upper side of the pixel $R_{00}$, and $w_y$ original image pixels on the lower side of the pixel $R_{00}$. In FIG. 10A, the square original image reference pixel block includes pixels $S_{33}$ to $S_{22}$ represented by circles. In FIG. 10B, the square original image reference pixel block includes pixels $S_{33}$ to $S_{22}$.

The black line discriminating unit 807 discriminates and extracts a black line from the original image reference pixels in step S905. Then, the black line centroid calculating unit 808 calculates the position of the centroid and the thickness of the black line in the original image reference pixels by using information about the black line extracted by the black line discriminating unit 807 in step S906. The black line centroid calculating unit 808 detects the thickness (line width) of the black line extracted from the original image reference pixels by the black line discriminating unit 807, in which the number of successive black pixels along the width of the black line is detected. The converted black pixel determining unit 809 determines a pixel at which the black line is retained among the original image reference pixels and reduced pixels around the original image reference pixels in step S907. A black line retaining pixel determining method to be carried out by the converted black pixel determining unit 809 will be described later. The color of the reduced pixel determined by the converted black pixel determining unit 809 is stored in the converted black pixel storage unit 810 in step S907. Finally, the converted pixel density calculating unit 811 calculates the converted pixel by using the information about the converted black pixel stored in the converted black pixel storage unit 810 in step S908.

This image reducing procedure is executed for all the image data in step S902. After the completion of the image reducing procedure, a reduced image is stored in the reduced image storage unit 812, is transferred through the image output unit 813 to the CRT 814 for displaying or to a printer 815 for printing or is sent through the interface 816 to an external information device in step S909. The reduced image may be sent through the interface 116 to an external information device after being compressed by the image output unit 813 by a known image compressing method.

The extracted black lines having a longitudinal length less than a predetermined optional length t may be regarded as noise and not as fine lines, and need not necessarily be mapped to the reduce image. Furthermore, the extracted horizontal black lines having a length less than a length $j/n_x+k$, where j and k are optional constants, and the extracted vertical black lines having a length less than a length $h/n_y+i$, where h and i are optional constants, may be regarded as noise in the image and need not necessarily be mapped to the reduce image. The omission of such extracted black lines is effective in eliminating noise and in the improvement of the quality of the reduced image.

A black line retaining pixel determining procedure to be carried out by the converted black pixel determining unit 809 will be described hereinafter. In the second embodiment, a pixel for retaining a black line is determined on the basis of the line width of the black line.

Supposing that a black line in the reduce image has a lateral width $m_x$ (the number of reduced pixels), a longitudinal width $m_y$ (the number of reduced pixels), the lateral width and the longitudinal width (the number of original image pixels) of the original image are $d_x$ and $d_y$, the horizontal reference pixel width $w_x=[1/n_x]$ and the vertical reference pixel width $w_y=[1/n_y]$, the width of the black line in the reduced image is determined according to the reduction ratios $n_x$ and $n_y$ and the following expressions.

$$1 \geq [d_x \times n_x + k] \ldots m_x = 1$$
$$j = [d_x \times n_x + k] \ldots m_x = j$$
$$1 \geq [d_y \times n_y + i] \ldots m_y = 1$$
$$h = [d_y \times n_y + i] \ldots m_y = h \quad (3)$$

where k is an optional real number, $d_x \leq w_x$, i is an optional real number and $d_y \leq w_y$.

The values k and i may be specified by the operator before starting the image reducing procedure or may be automatically determined by the image reducing system according to the reduction ratios. The widths $m_x$ and $m_y$ of the black line in the reduced image are determined by multiplying the widths $d_x$ and $d_y$ of the black line in the original image by the reduction ratios $n_x$ and $n_y$, and rounding up the decimal parts of the products. For example, when $n_x=n_y=\frac{1}{3}$ and k=i=0, $$3 \geq d_x \text{ (or } d_y) \ldots m_x \text{ (or } m_y)=1$$
$$6 \geq d_x \text{ (or } d_y)>3 \ldots m_x \text{ (or } m_y)=2$$
$$9 \geq d_x \text{ (or } d_y)>6 \ldots m_x \text{ (or } m_y)=3 \quad (4)$$

When $nx=n_y=\frac{1}{3}$, k=−1 and i=−1, $$6 \geq d_x \text{ (or } d_y) \ldots m_x \text{ (or } m_y)=1$$
$$9 \geq d_x \text{ (or } d_y)>6 \ldots m_x \text{ (or } m_y)=2$$
$$12 \geq d_x \text{ (or } d_y)>9 \ldots m_x \text{ (or } m_y)=3 \quad (5)$$

It is also possible to determine the widths $m_x$ and $m_y$ of the black line in the reduced image by multiplying the widths $d_x$ and $d_y$ of the black line in the original image by the reduction ratios $n_x$ and ny and rounding down the decimal parts of the products as expressed by the following expressions.

$$i \geq <d_x \times n_x + k> \ldots m_x=1$$
$$j=<d_x \times n_x + k> \ldots m_x=j$$
$$1 \geq <d_y \times n_y + i> \ldots m_y=1$$
$$h=<d_y \times n_y + i> \ldots m_y=h \quad (6)$$

where k and i are optional real numbers, $d_x \leq w_x$ and $d_y \leq w_y$. In expressions (6), < > indicates the rounding down of the decimal part; for example, <a> represents an integral number p meeting (p+1)>a≧p.

The values of k and i may be specified by the operator before starting the image reducing procedure or may be automatically determined by the image reducing system according to the reduction ratios.

For example, when $n_x=n_y=\frac{1}{3}$ and k=i=0, $m_x$ and $m_y$ are determined as expressed by the following expressions.

$5 \geq d_x$ (or $d_y$) ... $m_x$ (or $m_y$)=1

$8 \geq d_x$ (or $d_y$)>5 ... $m_x$ (or $m_y$)=2

$11 \geq d_x$ (or $d_y$)>8 $m_x$ (or $m_y$)=3  (7)

When $n_x=n_y=\frac{1}{3}$ and k=1 and i=1, $m_x$ and $m_y$ are determined as expressed by the following expressions.

$2 \geq d_x$ (or $d_y$) ... $m_x$ (or $m_y$)=1

$5 \geq d_x$ (or $d_y$)>2 ... $m_x$ (or $m_y$)=2

$8 \geq d_x$ (or $d_y$)>5 ... $m_x$ (or $m_y$)=3  (8)

The relation between the width of the black line in the original image and that of the black line in the reduced image is thus specified, the width of the black line in the original image is detected, and then the corresponding width of the black line in the reduced image is determined.

A method of determining the color of the reduced pixel on the basis of the original image reference pixels and color information about the same will be described hereinafter with reference to FIGS. 11A, 11B, 11C, 11D and 11E.

Figure 11A:
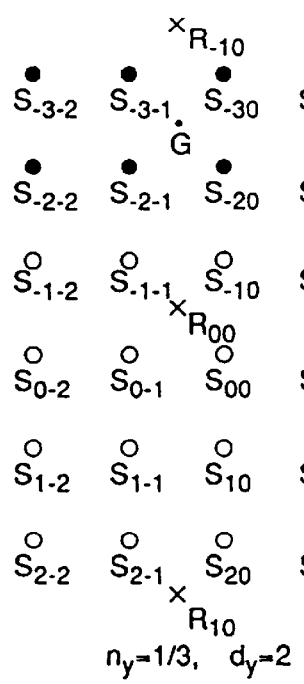
FIGS. 11A, 11B, 11C, 11D and 11E are diagrams for explaining a method of determining the centroid of a black line and a pixel at which the black line is to be retained to be carried out by the image reducing system in the second embodiment.
Figure 11B:
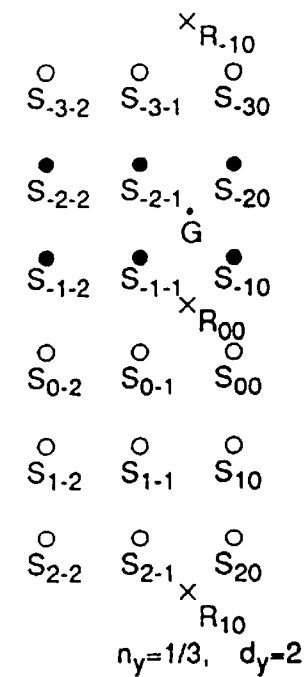
Figure 11C:
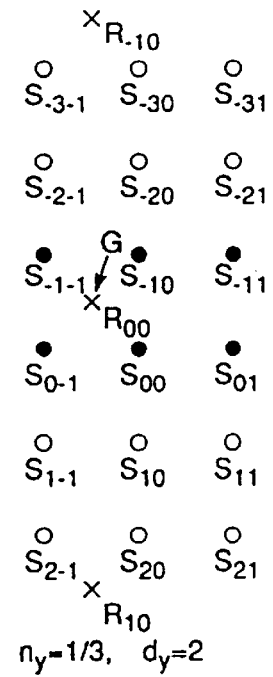
Figure 11D:
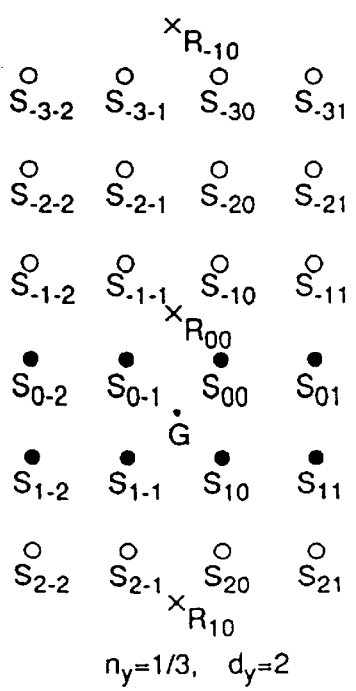
Figure 11E:
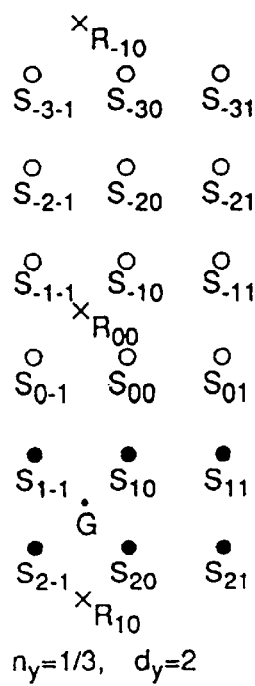

In FIGS. 11A to 11E, original image reference pixels indicated at $S_{pq}$ are represented by circles and reduced pixels indicated at $R_{rs}$ are represented by crosses. In FIG. 11A, original image reference pixels $S_{-3-2}$ to $S_{-31}$ and $S_{-2-2}$ to $S_{-21}$ are black pixels and the rest are white pixels. In FIG. 11B, original image reference pixels $S_{-2-2}$ to $S_{-21}$ and $S_{-1-2}$ to $S_{-11}$ are black pixels and the rest are white pixels. In FIG. 11C, original image reference pixels $S_{0-2}$ to $S_{01}$ and $S_{1-2}$ to $S_{11}$ are black pixels and the rest are white pixels. In FIG. 11D, original image reference pixels $S_{0-2}$ to $S_{01}$ and $S_{1-2}$ to $S_{11}$ are black pixels and the rest are white pixels. In FIG. 11E, original image reference pixels $S_{1-2}$ to $S_{11}$ and $S_{2-2}$ to $S_{21}$ are black pixels and the rest are white pixels. Indicated at G are the centroids of black lines. In FIGS. 11A to 11E, the vertical reduction ratio $n_y=\frac{1}{3}$.

In FIGS. 11A to 11E, the widths of the horizontal black lines are equal to 2-pixel width. From the definition by expression (3) and the width $d_y=2$ of the black lines in the original image, the widths of reduced black lines $m_y=1$.

When $i \leq \frac{1}{3}$, $1 \geq [d_y \times n_y + i] = [d_y/3 + i]$ ... $m_y=1$ $h = [d_y \times n_y + i] = [d_y/3 + i]$ ... $m_y=h$  (9)

The black pixels are retained at a reduced pixel nearest to the centroid G. For example, in FIG. 11A, the black line is retained at a reduced pixel $R_{-10}$. Similarly, at a reduced pixel $R_{00}$ in FIGS. 11B, at a reduced pixel $R_{00}$ in FIG. 11C, at a reduced pixel $R_{00}$ in FIG. 11D and at a reduced pixel $R_{10}$ in FIG. 11(e).

In the following case, $m_y=2$ because $d_y=2$ in FIGS. 11A to 11E.

When $\frac{1}{3} < i \leq \frac{4}{3}$, $i \geq [d_y \times n_y + i] = [d_y/3 + i]$ ... $m_y=1$ $h = [d_y \times n_y + i] = [d_y/3 + i]$ ... $m_y=h$  (10)

In this case, two reduced pixels near the centroid G are converted into black pixels. Then, the black line is retained at reduced pixels $R_{-10}$ and $R_{00}$ in FIG. 11A, at reduced pixels $R_{-10}$ and $R_{00}$ in FIG. 11B, at reduced pixels $R_{-10}$ and $R_{00}$ in FIG. 11C, at reduced pixels $R_{00}$ and $R_{10}$ in FIG. 11D and at reduces pixels $R_{00}$ and $R_{10}$ in FIG. 11E.

Another method of determining the color of reduced pixels on the basis of the original image reference pixels and color information about the same will be described with reference to FIGS. 12A, 12B, 12C and 12D.

Figure 12A:
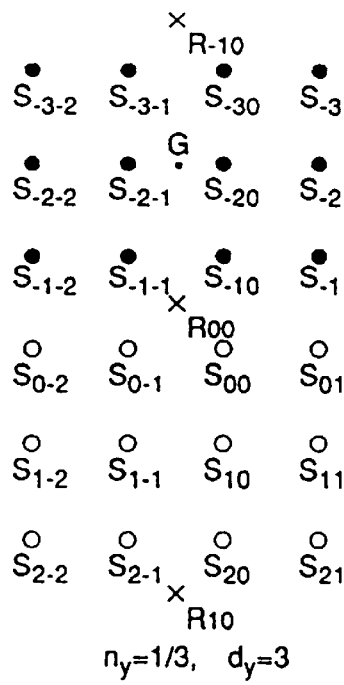
FIGS. 12A, 12B, 12C and 12D are diagrams for explaining another method of determining the centroid of a black line and a pixel at which the black line is to be retained to be carried out by the image reducing system in the second embodiment.
Figure 12B:
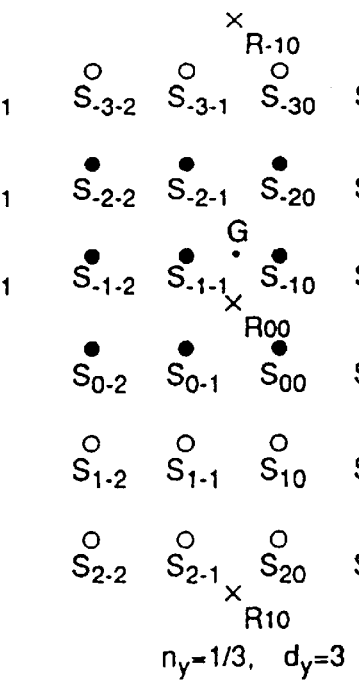
Figure 12C:
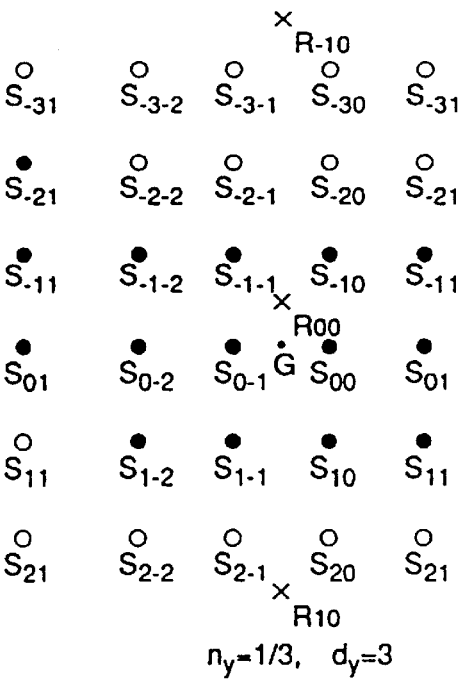
Figure 12D:
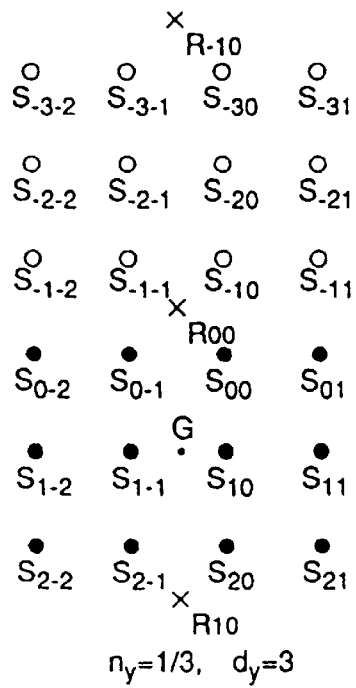

In FIGS. 12A to 12D, original image reference pixels are indicated at $S_{pq}$ and reduces pixels are indicated at $R_{rs}$. In FIG. 12A, original image reference pixels $S_{-3-2}$ to $S_{-11}$ are black pixels and the rest are white pixels. In FIG. 12B original image reference pixels $S_{-2-2}$ to $S_{01}$ are black pixels and the rest are white pixels. In FIG. 12C, original image reference pixels $S_{-1-2}$ to $S_{11}$ are black pixels and the rest are white pixels. In FIG. 12D, original image reference pixels $S_{0-2}$ to $S_{21}$ are black pixels. In FIGS. 12A to 12D, indicated at G are centroids of black lines, and the vertical reduction ratio $n_y=\frac{1}{3}$.

The widths of horizontal black lines shown in FIGS. 12A to 12D are equal to 3-pixel width. The line width my of the black line in the reduced image is determined by the definition expressed by expression (3) on the basis of the width $d_y$ of the black line in the original image. In the following case $m_y=1$ because $d_y=3$.

When $i \geq 0$, $1 \geq [d_y \times n_y + 1] = [d_y/3 + i]$ ... $m_y=1$ $h = [d_y \times n_y + i] = [d_y/3 + i]$ ... $m_y=h$  (11)

Black pixels are retained at a reduced pixel nearest to the centroid G. In FIG. 12A, the black line is retained at a reduced pixel $R_{-10}$. Similarly, at $R_{00}$ in FIG. 12B, at $R_{00}$ in FIG. 12(c) and at $R_{00}$ in FIG. 12D.

In the following case, $m_y=2$ because $d_y=3$.

When $0 < i \leq 1$ $1 \geq [d_y \times n_y + i] = [d_y/3 + i]$ ... $m_y=1$ $h = [d_y \times n_y + i] = [d_y/3 + i]$ ... $m_y=h$  (12)

In this case, two reduced pixels near the centroid G are converted into black pixels to retain the black pixels. In FIG. 12A the black pixels are retained at reduced pixels $R_{-10}$ and $R_{00}$, at reduced pixels $R_{-10}$ and $R_{00}$ in FIG. 12B, at reduced pixels R00 and $R_{10}$ in FIG. 12(c) and at reduced pixels $R_{00}$ and $R_{10}$ in FIG. 12D.

In the second embodiment, the line widths of black lines in the reduced image corresponding to black lines of the same width in the original image are not dependent on the position of the black lines in the original image.

An image reducing system in a third embodiment according to the present invention will be described hereinafter with reference to FIG. 13.

Figure 13:
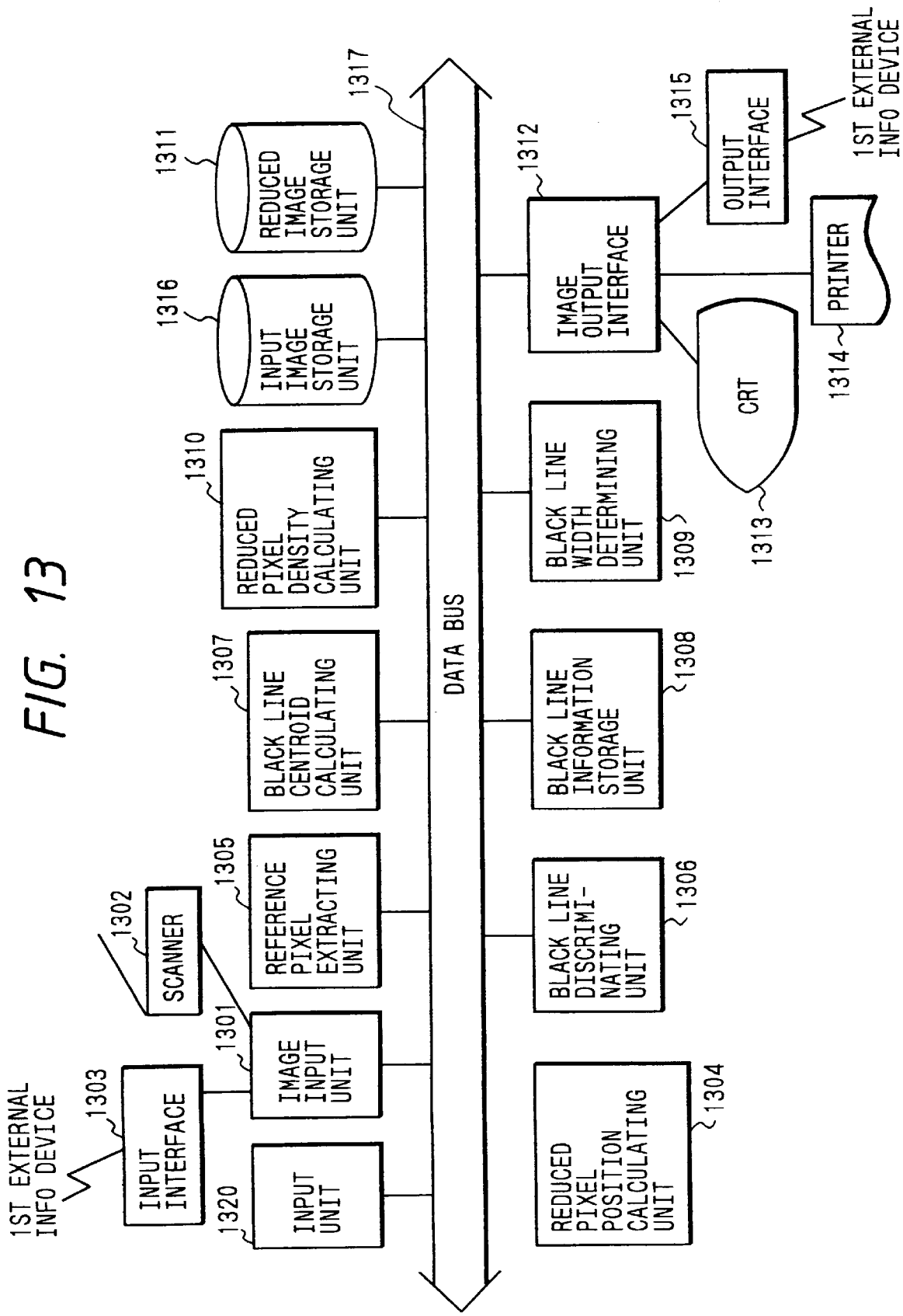
FIG. 13 is a block diagram of an image reducing system in a third embodiment according to the present invention.

Referring to FIG. 13, an image input unit 1301 receives image data through a network or an interface; a scanner 1302 scans a recording sheet or the like to obtain image data; an input interface 1303 receives image data from an external information device; an input unit 1320 accepts instructions including reducing ratios; a converted pixel position calculating unit 1304 calculates the position of a reduced pixel to be converted relative to an original image pixel array; a reference image extracting unit 1305 extracts original image reference pixels corresponding to a pixel to be reduced and converted; a black line discriminating unit 1306 discriminates and extracts a black line from the extracted original image reference pixels; a black line centroid calculating unit 1307 calculates the width and the centroid of the extracted black line on the basis of black line information provided by the extracted black line and a converted pixel above or on the left-hand side of the extracted black line; a black line information storage unit 1308 stores the black line information; a black line width determining unit 1309 determines the width of the black line in the reduced image by using black line information about the black line extracted from the reference pixels and a converted block; a converted pixel density calculating unit 1310 calculates a reduced pixel to retain the black line on the basis of the position of the centroid and the width of the black line; a reduced image storage unit 1311 stores a reduced image; an image output unit 1312 gives the data of a reduced image to a CRT, the scanner 1302 and/or through an interface to an external information device; a display unit 1313, such as a CRT, displays an image; a printing unit 1314, such as a printer, prints an image on a recording sheet; an output interface 1315 transfers an image to an external information device; and an input image storage unit 1316 stores an input image. Data is exchanged between the components of the image reducing system through a data bus 1317.

In this image reducing system, the input image storage unit 1316 may be connected through the image input unit 1301 to the data bus 1317, the reduced image storage unit 1311 may be connected through the image output unit 1312 to the data bus 1317, the input image storage unit 1316 and the reduced image storage unit 1311 may be substituted by a single image storage unit, and the input interface 1303 and the output interface 1315 may be substituted by a single I/O interface. In this image reducing system, the input image storage unit 1316 may be a magnetic disk apparatus, an optical disk apparatus, a magnetooptic disk apparatus or a CD-ROM. Similarly, the reduced image storage unit 1311 may be a magnetic disk apparatus, an optical disk apparatus or a magnetooptic disk apparatus.

The operations of the components of the image reducing system shown in FIG. 13 will be described with reference to a PAD shown in FIG. 14.

When reducing an image, the image reducing system determines the positions of converted pixels first on the basis of reduction ratios, determines a reference pixel block, and then, similarly to the image reducing system in the second embodiment, extracts a black line and the width of the black line from reference pixels. When the black line has the head end and the tail end in the reference pixel block, the centroid of the black line in the reference pixel block is determined by calculation or by making reference to a conversion table prepared beforehand, and then a decision is made as to if the black line is to be retained on the basis of the relation between the position of the centroid and the line width of the black line in the reference pixel block, and four reference pixel blocks surrounding a reduced pixel (first mode). The image reducing system detects the upper end and the left-hand end of a black line in a reference pixel block, makes a query to see if the black line extends in an adjacent reference pixel block and detects the width and the ends of the black line. Then, the image reducing system determines the centroid of a black line extending in a plurality of reference pixel blocks by calculation or by making reference to a predetermined conversion table, and then makes a decision as to if the black line is to be retained on the basis of the relation between the position of the centroid and the width of the black line in the reference pixel blocks, and four reference pixel block surrounding a reduced pixel (second mode). Reduced pixels are determined by operations in the first mode and the second mode.

Figure 14:
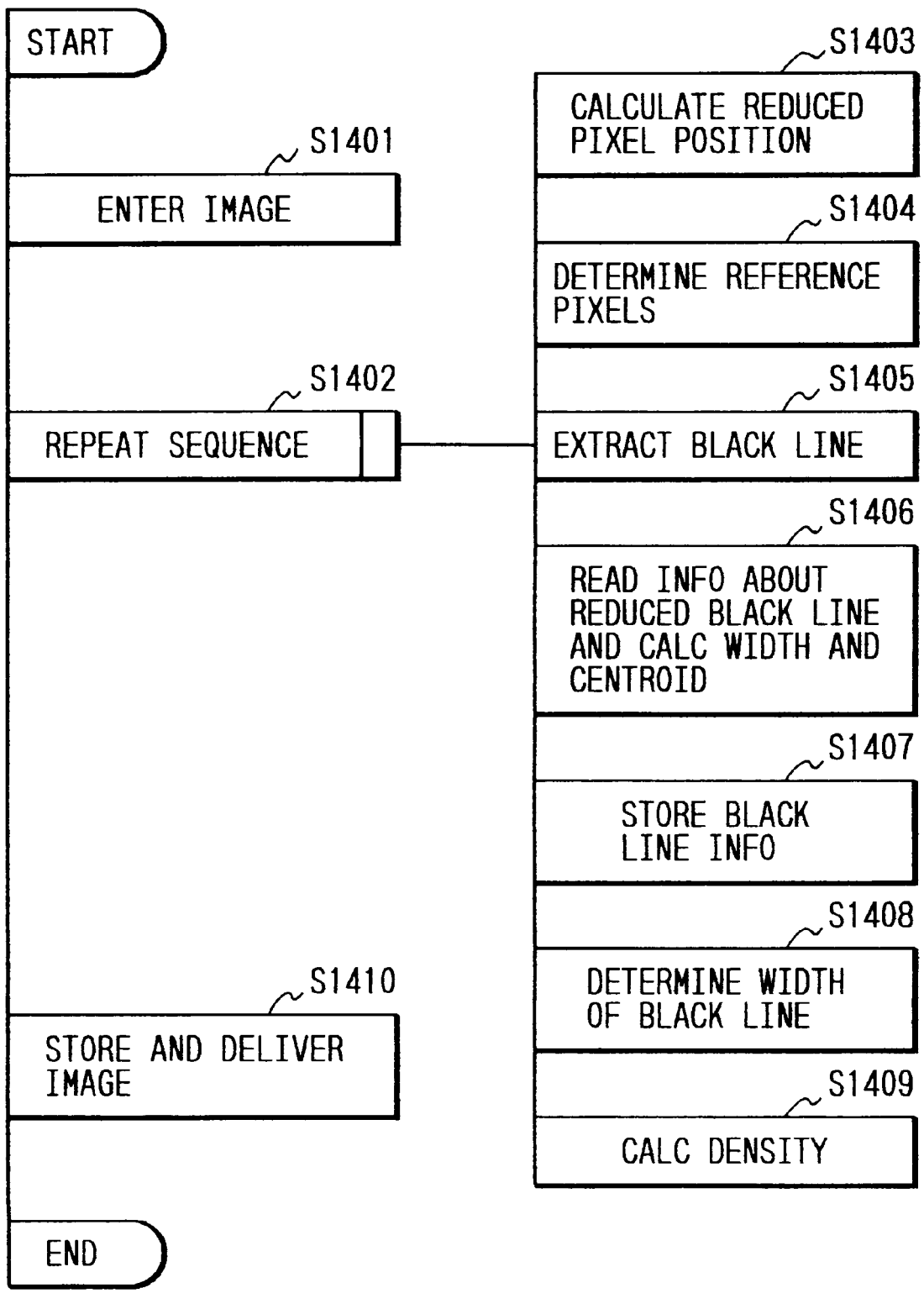
FIG. 14 is a PAD of a procedure to be executed by the image reducing system in the third embodiment.

Referring to FIG. 14, the image input unit 1301 enters image data in step S1401. The image data may be read through a network or the interface 1303 from an external information device, may be acquired by the scanner 1302, i.e., an image input apparatus, or may be fetched from the input image storage unit 1316. The input image may be a coded data coded by some coding method and may be decoded by the image input unit 1301.

An image reducing procedure is executed in step S1402 for the head data through the tail data of the image data. In the image reducing procedure, first the converted pixel position calculating unit 1302, similarly to that in the first embodiment, calculates the position of a reduced pixel to be converted relative to an original image pixel array in step S1403. Then, the reference pixel extracting unit 1305 extracts original image reference pixels to be subjected to reduction and conversion by using the position of the reduced pixel relative to the original pixel array and reduction ratios in step S1404. FIGS. 15A and 15B show original image reference pixel blocks extracted by the image reducing system by way of example.

In FIGS. 15A and 15B, original image reference pixels are indicated at $S_{pq}$, reduced pixels are indicated at $R_{rs}$ and reduced pixels to be converted are indicated at $R_{00}$. In FIG. 15A, the horizontal reduction ratio $n_x=\frac{1}{3}$ and the vertical reduction ratio $n_y=\frac{1}{3}$. In FIG. 15B, the horizontal reduction ratio $n_x=\frac{2}{5}$ and the vertical reduction ratio $ny=\frac{1}{3}$. A pixel $S_{00}$ near and on the lower right-hand side of the reduced pixel $R_{00}$ is a starting original image reference pixel, and a reference pixel block is a square block as far as an original image pixel on the right-hand side of the original image pixel $S_{00}$, and near and on the lower left-hand side of the next right-hand reduced pixel $R_{01}$, and similarly, as far as an original image pixel below the original image pixel $S_{00}$, and near and on the upper right-hand side of the next lower reduced pixel $R_{10}$. In FIG. 15A, an original image reference pixel block is a square block including original image pixels $S_{00}$ to $S_{22}$. In FIG. 3B, an original image reference pixel block is a square block including original image pixels $S_{00}$ to $S_{21}$.

The black line discriminating unit 1306 discriminates and extracts black lines of the reference pixels from the original image reference pixel block. Then, the black line centroid calculating unit 1307 calculates the centroids of the black lines each not extending in the adjacent original image reference pixel block, i.e., a black line having opposite ends in one original image reference pixel block. From a black line information storage unit 1308, black line information about pixel blocks which have already been processed for reduction and conversion and positioned above and on the left-hand side, respectively, of the reduced pixel being processed is read. With a black line extending in a plurality of reference pixel blocks, the width of the black line extracted by the black line discriminating unit 1306 is added, and the black line centroid calculating unit 1307 calculates the thickness and the position of the centroid of the black line in step S1406, which will be described later. The calculated thickness and the position of the centroid of the black line is stored in the black line information storage unit 1308 in step S1407. The black line width determining unit 1309 determines the widths of fine black lines of a reduced image in step S1408 by using the thicknesses of the black lines calculated by the black line centroid calculating unit 1307. The converted pixel density calculating unit 1310 determines reduced pixels for retaining the black lines on the basis of the widths of black lines of a reduced image, reduced pixels and the positions of the centroids of the black lines in step S1409.

This image reducing procedure in step S1402 is repeated for all the image data. After the completion of the image reducing operation, the image output unit 1312 provides a reduce image in step S1410. The reduced image is given to the reduced image storage unit 1311, to the CRT 1313 or the printer 1314, or through the output interface 1315 to an external information device. The reduce image may be compressed by the image output unit 813 by a known compressing method, and the compressed, reduced image may be transferred through the interface 116 to an external information device.

It is also possible that the image reducing system regards the extracted fine black lines having a length less than t (t is an optional constant) as noise in the image, does not regard the same as fine lines and does not map the same to the reduced image. Furthermore, it is possible that the image reducing system regards horizontal fine lines having a length less than $j/n_x+k$ (j, and k are optional numbers) and vertical fine lines having a length less than $h/n_y+i$ (h and i are optional numbers) as noise, does not regard as fine lines and does not map the same to the reduced image, which is effective in eliminating noise and improving the quality of the reduced image.

Figure 18:
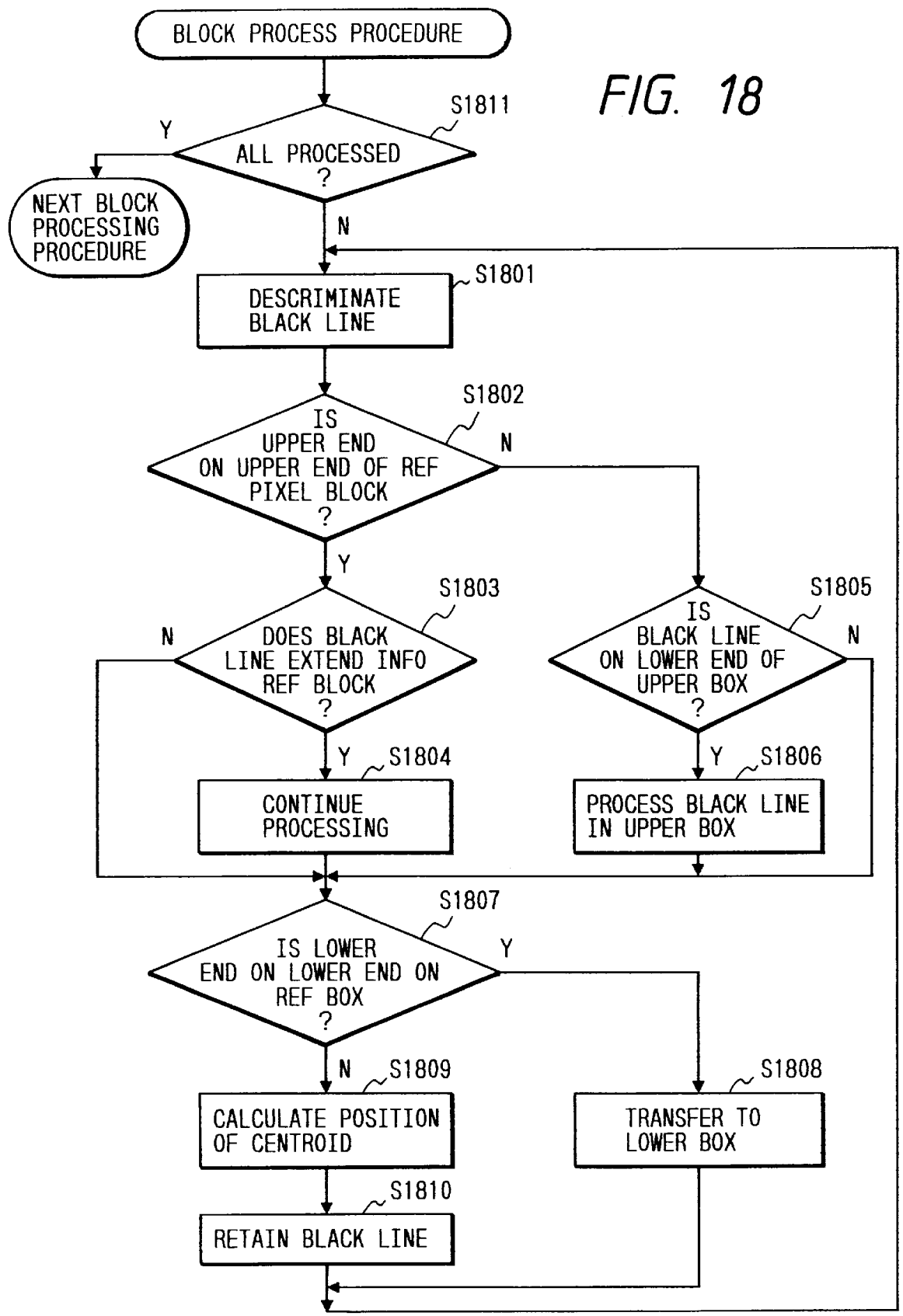
FIG. 18 is a flow chart of an algorithm for determining the width and the position of a black line by the image reducing system in the third embodiment.
Figure 21:
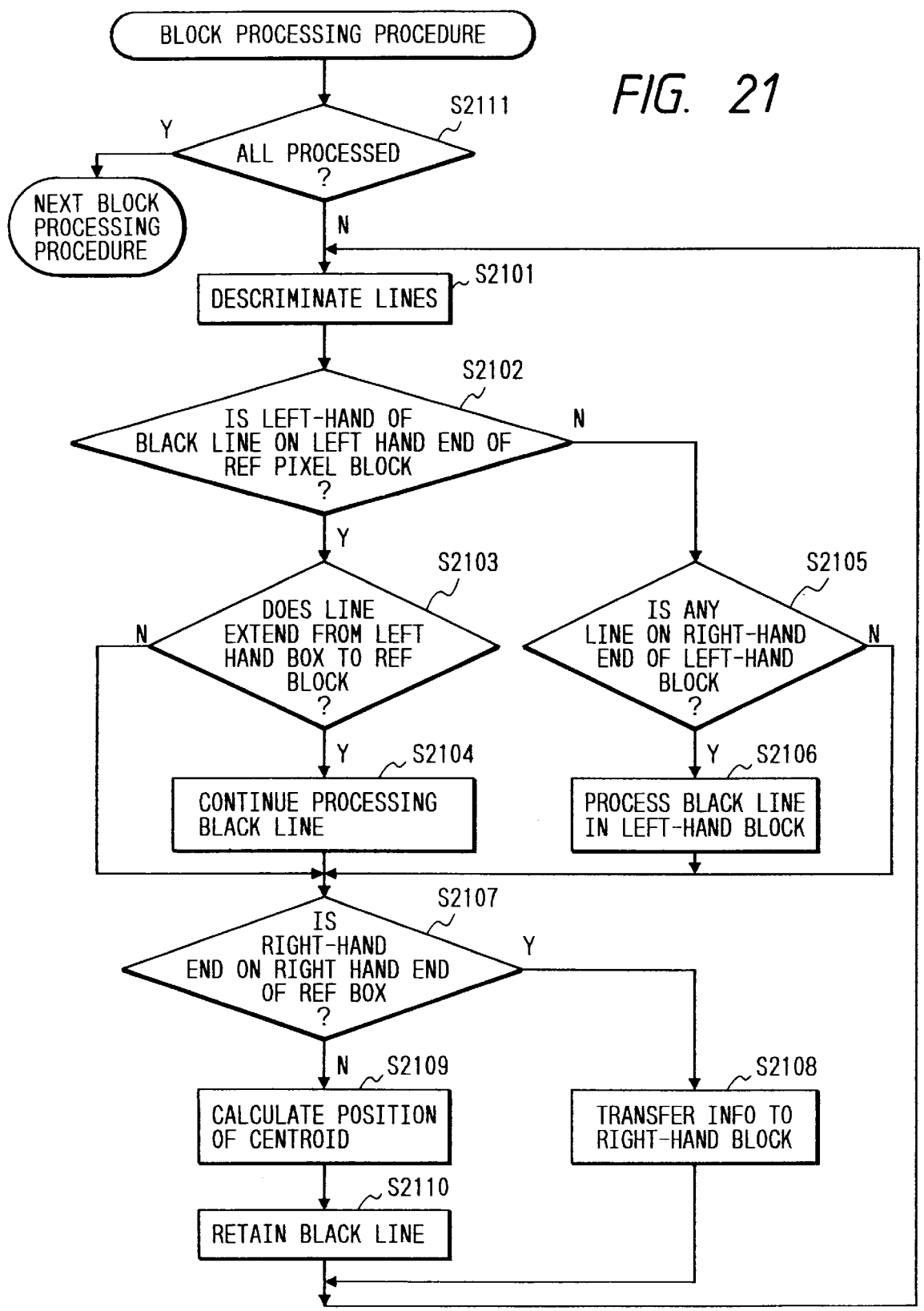
FIG. 21 is a flow chart of an algorithm for determining the width and the position of a black line to be carried out by the image reducing system in the third embodiment.

An algorithm for determining the width and the position of a black line by the image reducing system in the third embodiment will be described with reference to FIGS. 18 and 21. FIG. 18 shows a procedure for determining the width and the position of a black line having width along a vertical direction, and FIG. 21 shows a procedure for determining the width and the position of a black line having width along a horizontal direction. The width and the position of a vertically and horizontally continuous black line may be determined by the procedures shown in FIGS. 18 and 21.

Referring to FIG. 18, the black line discriminating unit 1306, similarly to that in the first embodiment, discriminates a black line in a reference pixel block in step S1801. When discriminating a black line, the black line discriminating unit 1306 holds the position of the upper end of each black line and black line information indicating that the reference pixel area includes a black line. Then, the black line discriminating unit 1306 makes a decision as to if the upper end of the black line is on the upper end of a reference pixel block contiguous with an upper block, using upper block black line information in step S1802. If the upper end of the black line is on the upper end of the reference pixel block, the black line discriminating unit 1306 makes a decision as to if the black line extends in the upper block, namely, if the black line extends continuously from the upper block into the reference pixel block, in step S1803. If the black line extends in both the upper block and the reference pixel block, the black line discriminating unit 1306 determines the position and the width of the black line in both the upper block and the reference pixel block in step S1804.

In an exceptional case in which a black line extends on the lower end of the upper block and white pixels are on the upper end of the reference pixel block, namely, when the response to a query in step S1805 is affirmative, it is decided that the black line terminates in the upper block and the position and the width of the black line is retained in step S1806. If the lower end of the black line is on the lower end of the reference pixel block, namely, when the response to a query in step S1807 is affirmative, it is possible that the black line extends into the lower block and therefore, the width and the centroid of the black line are not calculated and only information indicating that the line is a black line is retained in step S1808. Thus the algorithm is executed to determine the position and the width of the black line having width along a vertical direction in the reference pixel block, the position of the centroid of the black line is calculated in step S1809, and then a procedure for reducing and converting the black line is executed in step S1810.

FIG. 21 shows a procedure for determining the position and the width of a black line having width along a horizontal direction. Referring to FIG. 21, first the black line discriminating unit 1306, similarly to that in the first embodiment, discriminates a black line in a reference pixel block in step S2101. When discriminating the black line, the black line discriminating unit 1306 holds black line information indicating the position of the left-hand end of the black line and the presence of the black line in the reference pixel block. The black line discriminating unit 1306 makes a decision as to if the left-hand end of the black line is on the left-hand end of the reference pixel block contiguous with a block by using the black line information in step S2102. If the left-hand end of the black line is on the left end of the reference pixel block, a query is made to see if the black line extends in the left-hand block, namely, if the black line extends from the left-hand block into the reference pixel block, in step S2103. If the response in step S2103 is affirmative, the position and the width of the black line in the left-hand block and the reference pixel block are determined in step S2104.

In an exceptional case in which a black line extends on the right-hand end of the left-hand block, and white pixel are on the left-end of the reference pixel block, namely, if the response to a query in step S2105 is affirmative, it is decided that the black line terminates in the left-hand block, and the position and the width of the black line is retained in step S2106. If the right-hand end of the black line is on the right-hand end of the reference pixel block, namely, if the response to a query in step S2107 is affirmative, it is possible that the black line extends into a right-hand block and therefore the width and the position of the centroid of the black line is not calculated and information indicating that the line is a black line is retained in step S2108. Thus the algorithm is executed to determine the width and the position of the black line having width along a horizontal direction in the reference pixel block, the position of the centroid of the black line is calculated in step S2109 and a procedure for reducing and converting the black line is executed in step S2110.

In the procedures shown in FIGS. 18 and 21, the black line is transferred to each block by either of the following two methods.

Figure 24:
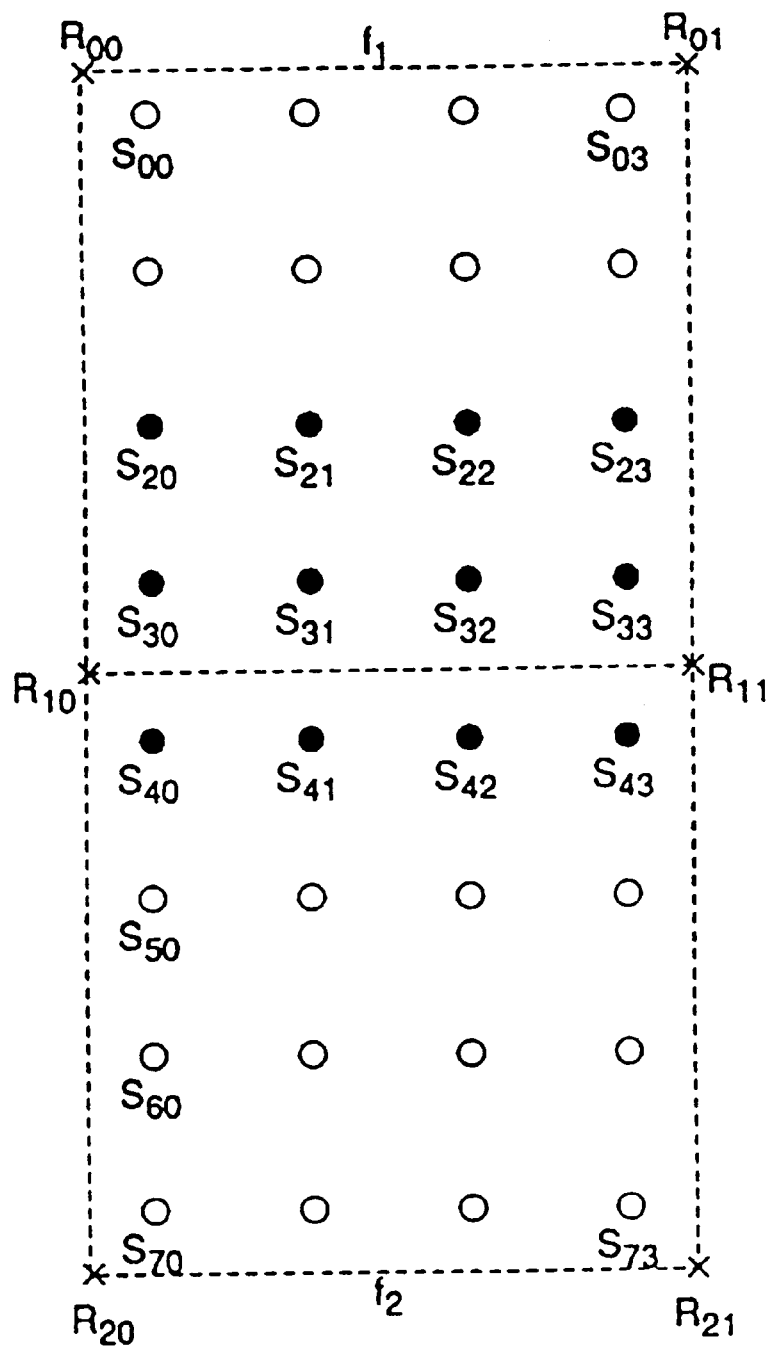
FIG. 24 is a diagram for explaining an algorithm for determining the width and the position of a black line to be executed by the image reducing system in the third embodiment.

(1) A first method transfers the information indicating the presence of a black line and the width of the black line for each block. For example, suppose that a horizontal black line having a 3-pixel width extends over two blocks $f_1$ and $f_2$ as shown in FIG. 24. In the block $f_1$, a run of eight pixels $S_{20}$ to $S_{33}$ are regarded as a horizontal black line (which is the same decision as that made in the first embodiment). Since the lower side of the black line is a row of black pixels $S_{30}$ to $S_{33}$, it is possible that the black line has more horizontal rows of black pixels below the row of black pixels $S_{30}$ to $S_{33}$. In the case shown in FIG. 24, information indicating that the first block $f_1$ has a horizontal black line having a 2-pixel width is retained. With the second block $f_2$, a decision is made as to if there is a black line contiguous with the black line in the first block $f_1$ in the second block $f_2$. In this case, since a black line extends in the second block $f_2$ contiguously with the first block $f_1$, the width of the black line in the second block $f_2$ is detected, the 2-pixel width of the black line in the first block $f_1$ and the 1-pixel width of the black line in the second block $f_2$ are added to determine the black line having a 3-pixel width, and then the centroid of the black line is determined. Then, pixels to be retained are determined by a method of determining the line width of a reduced black line and a position at which the black pixels are to be retained. According to the definition expressed by expression (3), $m_y=1$ when i=0 and, from the position of the centroid G, black pixels are retained at a reduced pixel $R12_{10}$.

Figure 25:
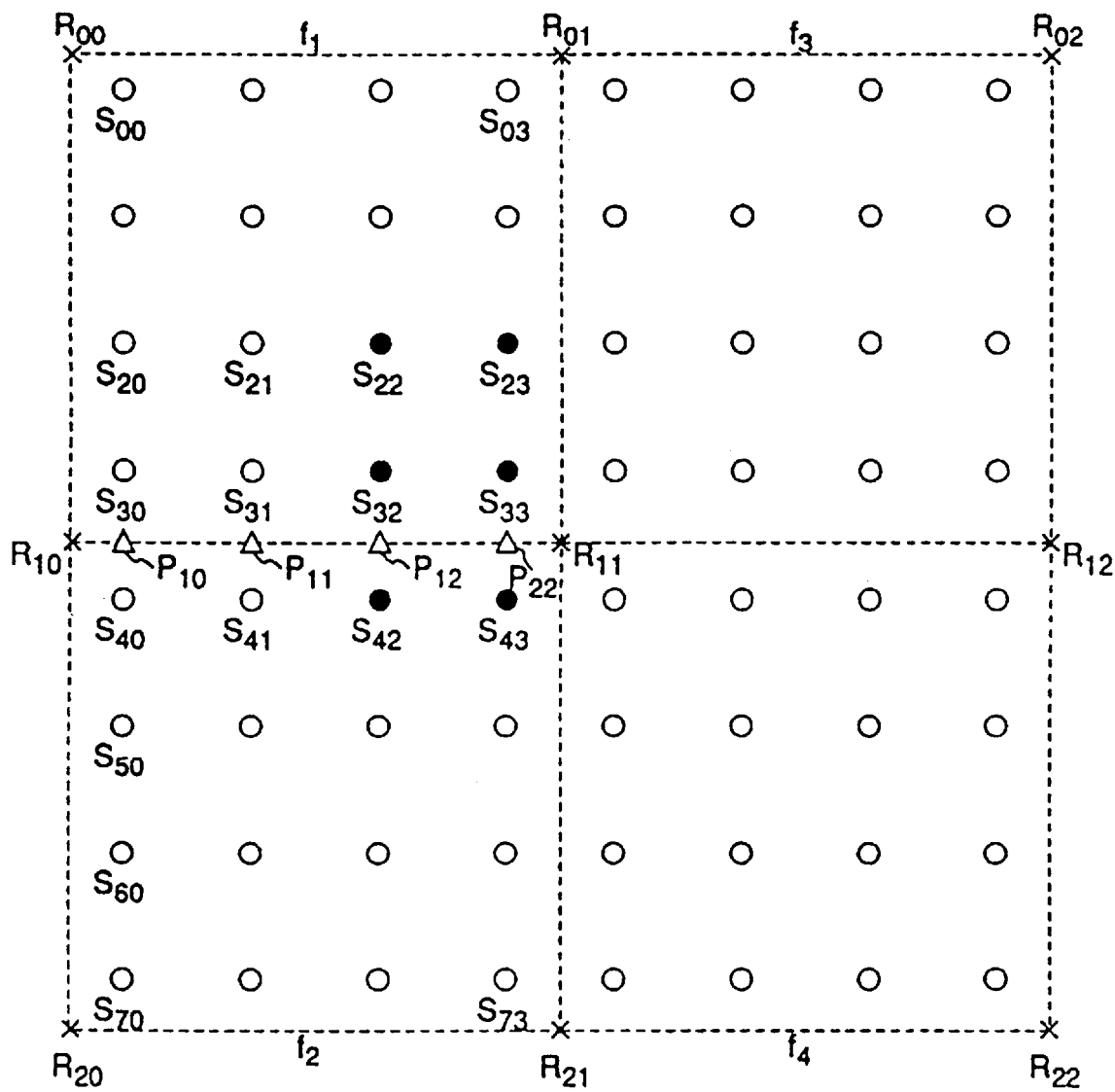
FIG. 25 is a diagram for explaining an algorithm for determining the width and the position of a black line to be executed by the image reducing system in the third embodiment.

(2) A second method transfers information indicating line width and the presence of a black line for each black line, For example, suppose that a vertical black line having a 2-pixel width extends over two blocks $f_1$ and $f_2$ as shown in FIG. 25. In the block $f_1$, it is decided that a vertical line $S_{x2}$ of pixels $S_{22}$ and $S_{32}$ is a black line having a 2-pixel width, and a vertical line $S_{x3}$ of pixels $S_{23}$ and $S_{33}$ is a black line having a 2-pixel width, and information about the black lines is transferred to the lower block $f_2$. It is also decided that a horizontal line $S_{2y}$ of pixels $S_{22}$ and $S_{23}$ is a black line having a 2-pixel width, and a horizontal line $S_{2y}$ of pixels $S_{32}$ and $S_{33}$ is a black line having a 2-pixel width, and information about the black lines is transferred to a right-hand block $f_3$. A process for the block $f_2$ makes a decision as to if there is any line continuous with the black line extending in the block $f_1$ in the block $f_2$. Since the line $S_{x2}$ is a black line, the width of the black line in the block $f_2$ is detected, the width of the black line in the block $f_2$, i.e., 1-pixel width, and the width of the black line in the block $f_1$, i.e., 2-pixel width, are added to provide a black line having a 3-pixel width. Since the line $S_{x3}$ has black pixels, the width of the black line in the block $f_2$ is detected, the width of the black line in the block $f_2$, i.e., 1-pixel width, and the width of the black line in the block $f_1$, i.e., 2-pixel width to provide a black line having a 3-pixel width. The same process is executed for the block $f_3$. Since the block $f_3$ does not include any black pixel (FIG. 25), it is decided that the black line terminates in the block $f_1$. With the block $f_2$, the centroid of the black line is determined on the basis of the width and the position of the line and a reduced pixel at which the black line is to be retained is determined.

Practically, as shown in FIG. 25, vertical reduced pixels $P_{10}$ to $P_{13}$ are determined beforehand, the line width of each vertical line in each block is retained for reduction, horizontal reduction is executed, and then color information about reduced pixels $R_{xy}$ is determined. For example, in FIG. 25, in the process for the block $f_2$, the vertical line of pixels $S_{22}$, $S_{32}$ and $S_{42}$ is retained at the pixel $P_{12}$, the vertical black line of pixels $S_{23}$, $S_{33}$ and $S_{43}$ is retained at the pixel $P_{13}$, and then the pixels $P_{10}$ to $P_{13}$ are subjected to reduction and conversion.

The line width and the end of the black line can be thus detected.

A method of determining pixels for retaining a black line to be executed by the black line discriminating unit 1306 and the black line width determining unit 1309 will be described hereinafter. This embodiment, similarly to the second embodiment, determines the number of reduced black pixels on the basis of the width and the length of the black line. The foregoing image reducing system determines the width of a black line in a reduced image by the following procedure using a horizontal reduction ratio $n_x$ and a vertical reduction ratio $n_y$, by using the horizontal width $m_x$ and the vertical width $m_y$ of a black line in the reduced image, and the horizontal width $d_x$ and the vertical width $d_y$ of the black line in the original image. Horizontal reference pixel width $w_x=1/n_x$ and vertical reference pixel width $w_y=1/n_y$.

$$1 \geq [d_x \times n_x + k] \ldots m_x = 1$$
$$j = [d_x \times n_x + k] \ldots m_x = j$$
$$1 \geq [d_y \times n_y + i] \ldots m_y = 1$$
$$h = [d_y \times n_y + i] \ldots m_y = h \tag{13}$$

where k and i are optional real numbers. The values of k and i may be specified by the operator of the image reducing system before starting the image reducing procedure or may be specified automatically by the image reducing system according to the reduction ratios.

The widths $m_x$ and $m_y$ of the black line of the reduced image are determined by multiplying the widths $d_x$ and $d_y$ of the black line of the original image by the reduction ratios $n_x$ and $n_y$, and rounding up the decimal parts of the products, respectively. For example, when $n_x=n_y=\frac{1}{3}$ and k=1=0, $$3 \geq d_x \text{ (or } d_y\text{)} \ldots m_x \text{ (or } m_y\text{)} = 1$$
$$6 \geq d_x \text{ (or } d_y\text{)} > 3 \ldots m_x \text{ (or } m_y\text{)} = 2$$
$$9 \geq d_x \text{ (or } d_y\text{)} > 6 \ldots m_x \text{ (or } m_y\text{)} = 3 \tag{14}$$

When $n_x = n_y = \frac{1}{3}$, k=1 and i=-1

$$6 \geq d_x \text{ (or } d_y\text{)} \ldots m_x \text{ (or } m_y\text{)} = 1$$
$$9 \geq d_x \text{ (or } d_y\text{)} > 6 \ldots m_x \text{ (or } m_y\text{)} = 2$$
$$12 \geq d_x \text{ (or } d_y\text{)} > 9 \ldots m_x \text{ (or } m_y\text{)} = 3 \tag{15}$$

The widths $m_x$ and $m_y$ of the black line of the reduced image may be determined by multiplying the widths $d_x$ and $d_y$ of the black line of the original image by the reduction ratios $n_x$ and $n_y$, and rounding down the decimal parts of the products, respectively. In this case, the image reducing system determines the widths $m_x$ and $m_y$ of the black line of the reduced image by using the widths $d_x$ and $d_y$ of the black line of the original image and the reduction ratios $n_x$ and $n_y$ by the following procedure.

$$1 \geq <d_x \times n_x + k> \ldots m_x = 1$$
$$j = <d_x \times n_x + k> \ldots m_x = j$$
$$1 \geq <d_y \times n_y + i> \ldots m_y = 1$$
$$h = <d_y \times n_y + i> \ldots m_y = h \tag{16}$$

where k and i are optional real numbers.

The values of k and i may be specified by the operator before starting the image reducing procedure or may be specified automatically by the image reducing system according to the reduction ratios.

For example, when $n_x=n_y=\frac{1}{3}$ and k=i=0, $$5 \geq d_x \text{ (or } d_y\text{)} \ldots m_x \text{ (or } m_y\text{)} = 1$$
$$8 \geq d_x \text{ (or } d_y\text{)} > 5 \ldots m_x \text{ (or } m_y\text{)} = 2$$
$$11 \geq d_x \text{ (or } d_y\text{)} > 8 \ldots m_x \text{ (or } m_y\text{)} = 3 \tag{17}$$

when $n_x=n_y=\frac{1}{3}$, k=1 and i=1, $$2 \geq d_x \text{ (or } d_y) \ldots m_x \text{ (or } m_y) = 1$$

$$5 \geq d_x \text{ (or } d_y) > 2 \ldots m_x \text{ (or } m_y) = 2$$

$$8 \geq d_x \text{ (or } d_y) > 5 \ldots m_x \text{ (or } m_y) = 3 \quad (18)$$

Thus, the black line can be formed in or omitted from the reduced by selectively determining value for k or i in expression (3); that is, it is possible to decide whether the black line is to be formed in the reduced image or whether the same black line is to be omitted by selectively determining a value for k or i, taking into consideration the number of pixels forming the black line of the original image. The value for k or i may be specified by operating the input unit or may be a predetermined value.

Thus, the width of the black line in the reduced image corresponding to the width of the black line in the original image is specified, the width of the black line in the original image is determined, and then the width of the black line in the reduced image is determined.

A procedure of determining the color of reduced pixel on the basis of original image reference pixels and color information about those pixels will be described by way of example with reference to FIGS. 16A, 16B and 16C. In this embodiment, it is decided there is a black line when an original image includes black pixels, and reference is made to the following original image pixel block to decide whether or not the black line is continuous.

In FIGS. 16(aO, 16B and 16C, original image reference pixels are indicated at $S_{pq}$ and reduced pixels are indicted at $R_{rs}$. In FIG. 16A, original image reference pixels $S_{00}$ to $S_{20}$ are black pixels and the rest are white pixels, in FIG. 16B, original image reference pixels $S_{10}$ to $S_{30}$ are black pixels and the rest are white pixels and, in FIG. 16C, original image reference pixels $S_{30}$ to $S_{50}$ are black pixels and the rest are white pixels. In FIGS. 16A, 16B and 16C, indicated at G are centroids, the vertical reduction ratio $n_y$ is ⅓.

Shown in FIGS. 16A to 16C are black lines each having a 3-pixel width. A black line in a reduced image has a width $m_y = 1$, because the black line of the original image has a width $d_y = 3$ When $i \leq 0$, $$1 \geq [d_y \times n_y + i] = [d_y/3 + i] \ldots m_y = 1$$

$$h = [d_y \times n_y + i] = [d_y/3 + i] \ldots m_y = h \quad (19)$$

The black pixels are retained at a reduced pixel nearest to the centroid G, namely, a pixel $R_{10}$ in FIG. 16A, a pixel $R_{10}$ in FIG. 16B and a pixel $R_{20}$ in FIG. 16C.

In the following case with FIGS. 16A to 16C, $m_y = 2$ because $d_y = 3$.

When $0 < i \leq 1$ $$1 \geq [d_y \times d_n + i] = [d_y/3 + i] \ldots m_y = 1$$

$$h = [d_y \times n_y + i] = [d_y/3 + i] \ldots m_y = h \quad (20)$$

In this case, two pixels nearest to the centroid G are converted into black pixels to retain the black pixels, namely, pixels $R_{00}$ and $R_{10}$ in FIG. 16A, pixels $R_{00}$ and $R_{10}$ in FIG. 16B and pixels $R_{10}$ and $R_{20}$ in FIG. 16C are converted into black pixels to retain the black pixels.

Another method of determining the color of reduced pixels on the basis of original image reference pixels and information about the color of those pixels will be described with reference to FIGS. 17A, 17B and 17C. In FIGS. 17A to 17C, original image reference pixels are indicated at $S_{pq}$ and reduced pixels are indicated at $R_{rs}$. In FIG. 17A, original image reference pixels $S_{00}$ to $S_{30}$ are black pixels and the rest are white pixels. In FIG. 17B, original image reference pixels $S_{10}$ to $S_{40}$ are black pixels and the rest are white pixels. In FIG. 17C, original image reference pixels $S_{30}$ to $S_{60}$ are black pixels and the rest are white pixels. In FIGS. 17A to 17C, centroids of black lines are indicated at G, and the vertical reduction ratio $n_y = ⅓$.

Shown in FIGS. 17A to 17C are black lines each having a 4-pixel width. In the following case, a black line in a reduced image has $m_y = 1$ because a black line in the original image has a width $d_y = 4$.

When $i \leq -⅓$, $$1 \geq [d_y \times n_y + i] = [d_y/3 + i] \ldots m_y = 1$$

$$h = [d_y \times n_y + i] = [d_y/3 + i] \ldots m_y = h \quad (21)$$

The black pixels are retained at a reduced pixel nearest to the centroid G, namely, at a reduced pixel $R_{10}$ in FIG. 17A, at a reduced pixel $R_{10}$ in FIG. 17B and at a reduced pixel $R_{20}$ in FIG. 17C.

In the following case with FIGS. 17A to 17C, $m_y = 2$ because $d_y = 4$.

When $-⅓ < i \leq ⅔$, $$1 \geq [d_y \times n_y + i] = [d_y/3 + i] \ldots m_y = 1$$

$$h = [d_y \times n_y + i] = [d_y/3 + i] \ldots m_y = h \quad (22)$$

In this case, two pixels nearest to the centroid G are converted into black pixels to retain the black pixels, namely, the black pixels are retained at pixels $R_{00}$ and $R_{10}$ in FIG. 17A, at pixels $R_{10}$ and $R_{20}$ in FIG. 17B and at pixels $R_{10}$ and $R_{20}$ in FIG. 17C.

In this embodiment, when reducing an original image, lines of an original image having the same width are converted quickly into lines of a reduced image having the same width regardless of the positions of the lines in the original image. When the original image is converted into a reduced image the width of lines in the reduced image are proportional to the width of lines in the original image regardless of the positions of the lines in the original image. Thus, a reduced image of high quality can be quickly produced.

While the present invention has been described in detail and pictorially in the accompanying drawings it is not limited to such details since many changes and modifications recognizable to those of ordinary skill in the art may be made to the invention without departing from the spirit and the scope thereof.

What we claim is:

1. An image reducing system comprising:
   an image input unit for entering an original image;
   an image reducing unit that reduces the original image entered by the image input unit based on reduction ratios; and
   an output unit that provides a reduced image formed by the image reducing unit;
   wherein said image reducing unit includes:
   a reduced pixel position specifying unit which specifies positions for reduced pixels relative to the original image based on the reduction ratios;
   a reference pixel block determining unit which determines a plurality of reference pixel blocks in the original image, each of said plurality of reference pixel blocks containing original image pixels and being defined by points corresponding to four reduced pixel positions specified by the reduced pixel position specifying unit;

a line extracting unit which extracts color information representing colors of original image pixels in each of said plurality of reference pixel blocks determined by the reference pixel block determining unit, said colors including at least one foreground color and at least one background color; and a pixel color determining unit which determines color information about at least one reduced pixel based on color information from said line extracting unit representing colors of original image pixels in a predetermined number of reference pixel blocks surrounding a position of said at least one reduced pixel relative to the original image.

2. An image reducing system according to claim 1, wherein the reduced pixel position specifying unit determines reduced pixel positions at horizontal intervals of $1/n_x$ and at vertical intervals of $1/n_y$, where $n_x$ is a horizontal conversion ratio smaller than 1 (one), $n_y$ is a vertical conversion ratio smaller than 1 (one), and the intervals of the pixels of the original image is 1 (one).

3. An image reducing system according to claim 1, wherein said output unit is a display device.

4. An image reducing system according to claim 3, wherein the line extracting unit identifies adjacent pixels in the original image which are of a same color as at least one line in the original image, and wherein said pixel color determining unit generates a line of color in the reduced image corresponding to said at least one line in the original image if said at least one line in the original image is longer than a predetermined length.

5. An image reducing system according to claim 1, wherein the pixel color determining unit determines color information about said at least one reduced pixel by performing a logical OR of color values generated for said at least one reduced pixel, said color values being generated based on the color information in respective ones of said predetermined number of reference pixel blocks surrounding the position of said at least one reduced pixel in the original image.

6. An image reducing system according to claim 1, wherein the image reducing unit holds beforehand a pattern of color information for each reduced pixel corresponding to pixels in the original image, in a reference pixel block corresponding to the reduction ratios, and achieves image reduction by matching the pattern and the pixels in the original image in the reference pixel block corresponding to the reduction ratios.

7. An image reducing system according to claim 1, wherein said output unit is a printer device.

8. An image reducing system according to claim 1, wherein said output unit is a facsimile device.

9. An image reducing system according to claim 4, wherein said output unit is a display device.

10. An image reducing system according to claim 4, wherein said output unit is a printer device.

11. An image reducing system according to claim 4, wherein said output unit is a facsimile device.

12. A method of reducing an original image, comprising the steps of:

specifying positions of pixels of a reduced image relative to the original image according to reduction ratios;

determining a plurality of reference pixel blocks in the original image, each of said plurality of reference pixel blocks containing original image pixels and being defined by four specified positions of reduced pixels;

extracting color information representing colors of original image pixels in each of said plurality of reference pixel blocks; and determining color information about at least one reduced pixel based on color information representing colors of original image pixels in a predetermined number of reference pixel blocks surrounding a position of said at least one reduced pixel relative to the original image.

13. A method according to claim 12, further comprising the steps of:

identifying adjacent pixels in the original image which are of a same color as at least one line in the original image; and generating a line of color in said reduced image corresponding to said at least one line of color in the original image if said at least one line of color in the original image exceeds a predetermined length.

14. A method for reducing an image, comprising:

specifying at least one reduction ratio for an original image; and converting the original image into a reduced image in accordance with steps which include:

dividing the original image into a plurality of pixel blocks based on said at least one reduction ratio, each of said plurality of pixel blocks containing original image pixels;

calculating, based on said at least one reduction ratio, position information for pixels in the reduced image relative to the original image;

determining a color of at least one pixel in the reduced image based on color information of pixels in a predetermined number of pixel blocks surrounding a position of said at least one pixel in the reduced image relative to the original image; and generating the reduced image based on said position information and said color information.

15. A method according to claim 14, wherein said determining step includes:

assigning a plurality of color values to said at least one pixel in the reduced image, said plurality of color values determined based on colors of original image pixels in respective ones of said predetermined number of pixel blocks, and determining the color of said at least one pixel in the reduced image based on a logical OR operation performed on said plurality of color values assigned to said at least one pixel in the reduced image.

16. A method according to claim 15, wherein said plurality of color values assigned to said at least one pixel in the reduced image are determined by referencing a conversion table stored in memory, which conversion table matches said plurality of color values with patterns of colors of original image pixels in respective ones of said predetermined number of pixel blocks.

17. A method according to claim 14, wherein said predetermined number of pixel is four.

18. A method according to claim 14, wherein said at least one reduction ratio includes a horizontal reduction ratio and a vertical reduction ratio.

19. A method according to claim 14, wherein said plurality of pixel blocks are of a size proportional to said at least one reduction ratio.

20. A method according to claim 19, wherein said at least one reduction ratio is selected so that said plurality of pixel blocks have differing numbers of rows and columns.

21. A method according to claim 14, wherein said plurality of pixel blocks are of different sizes determined by specifying different reduction ratios for selected portions of said original image.

22. A method according to claim 14, further comprising:
identifying lines of a color in said plurality of pixel blocks of original image pixels; and
generating lines of color in said reduced image corresponding to said lines of color in said plurality of pixel blocks of original image pixels.

23. A method according to claim 22, further comprising:
comparing a length of each of said lines of color identified in said plurality of pixel blocks of original image pixels with a predetermined length; and
producing in said reduced image only those lines of color, corresponding to said lines of color in said plurality of pixel blocks of original image pixels, having lengths longer than said predetermined length, to thereby reduce noise in the reduced image.

24. A method according to claim 22, further comprising:
comparing a width of each of said lines of color identified in said plurality of pixel blocks of original image pixels with a predetermined width; and
producing in said reduced image only those lines of color, corresponding to said lines of color in said plurality of pixel blocks of original image pixels, having widths greater than said predetermined width.

25. A method according to claim 14, wherein said original image and said reduced image are halftone images.

26. A method according to claim 14, wherein said original image and said reduced image are images containing at least one color in addition to the colors of black and white.

27. A system for reducing an image, comprising:
an input unit for receiving at least one reduction ratio for an original image;
an image extracting unit for dividing the original image into a plurality of pixel blocks based on said at least one reduction ratio, each of said plurality of pixel blocks containing original image pixels;
a calculating unit for calculating position information for pixels in the reduced image relative to the original image based on said at least one reduction ratio;
a color determining unit for determining a color of at least one pixel in the reduced image based on color information of pixels in a predetermined number of pixel blocks surrounding a position of said at least one pixel in the reduced image relative to the original image; and
a generating unit for generating the reduced image based on said position information and said color information.

28. A system according to claim 27, wherein said color determining unit assigns a plurality of color values to said at least one pixel in the reduced image, said plurality of colors determined based on colors of original image pixels in respective ones of said predetermined number of pixel blocks, and
wherein said color determining unit determines the color of said at least one pixel in the reduced image based on a logical OR operation performed on said plurality of color values assigned to said at least one pixel in the reduced image.

29. A system according to claim 28, wherein said color determining unit determines said plurality of color values assigned to said at least one pixel in the reduced image by referencing a conversion table stored in memory, which conversion table matches said plurality of color values with patterns of colors of original image pixels in respective ones of said predetermined number of pixel blocks.

30. A system according to claim 27, wherein said predetermined number of pixel blocks is four.

31. A system according to claim 27, wherein said at least one reduction ratio includes a horizontal reduction ratio and a vertical reduction ratio.

32. A system according to claim 27, wherein said plurality of pixel blocks are of a size proportional to said at least one reduction ratio.

33. A system according to claim 27, wherein said at least one reduction ratio is selected so that said plurality of pixel blocks have differing numbers of rows and columns.

34. A system according to claim 27, wherein said plurality of pixel blocks are of different sizes determined by specifying different reduction ratios for selected portions of said original image.

35. A system according to claim 27, further comprising:
a line identifying unit for identifying lines of a color in said plurality of pixel blocks of original image pixels; and
a line generating unit for generating lines of color in said reduced image corresponding to said lines of color in said plurality of pixel blocks of original image pixels.

36. A system according to claim 35, further comprising:
a unit for comparing a length of each of said lines of color identified in said plurality of pixel blocks of original image pixels with a predetermined length; and
a unit for generating in said reduced image only those lines of color, corresponding to said lines of color in said plurality of pixel blocks of original image pixels, having lengths longer than said predetermined length, to thereby reduce noise in the reduced image.

37. A system according to claim 35, further comprising:
a unit for comparing a width of each of said lines of color identified in said plurality of pixel blocks of original image pixels with a predetermined width; and
means for generating in said reduced image only those lines of color, corresponding to said lines of color in said plurality of pixel blocks of original image pixels, having widths greater than said predetermined width.

38. A system according to claim 27, wherein said original image and said reduced image are halftone images.

39. A system according to claim 27, wherein said original image and said reduced image are images containing at least one color in addition to the colors of black and white.

* * * * *